United States Patent
Ishibashi

(10) Patent No.: US 11,004,229 B2
(45) Date of Patent: May 11, 2021

(54) IMAGE MEASUREMENT DEVICE, IMAGE MEASUREMENT METHOD, IMAGING DEVICE

(71) Applicant: CANON KABUSHIKI KAISHA, Tokyo (JP)

(72) Inventor: Takuya Ishibashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/138,136

(22) Filed: Sep. 21, 2018

(65) Prior Publication Data

US 2019/0096079 A1   Mar. 28, 2019

(30) Foreign Application Priority Data

Sep. 28, 2017 (JP) .............................. JP2017-188390
Dec. 28, 2017 (JP) .............................. JP2017-253584

(51) Int. Cl.
| | |
|---|---|
| *G06T 7/62* | (2017.01) |
| *G06T 7/593* | (2017.01) |
| *H04N 7/18* | (2006.01) |
| *H04N 13/111* | (2018.01) |
| *H04N 13/239* | (2018.01) |
| *H04N 5/232* | (2006.01) |
| *H04N 13/00* | (2018.01) |

(52) U.S. Cl.
CPC ................ *G06T 7/62* (2017.01); *G06T 7/593* (2017.01); *H04N 13/111* (2018.05); *H04N 13/239* (2018.05); *H04N 2013/0081* (2013.01)

(58) Field of Classification Search
USPC ........... 348/211.9, 61, 42, 49, 240.99, 240.2, 348/240.3
See application file for complete search history.

(56) References Cited

U.S. PATENT DOCUMENTS

| | | | |
|---|---|---|---|
| 6,445,814 B2 * | 9/2002 | Iijima | G06T 7/55 382/154 |
| 2011/0249117 A1 | 10/2011 | Yoshihama et al. | |
| 2014/0098195 A1 * | 4/2014 | Pace | H04N 13/25 348/47 |
| 2014/0210999 A1 * | 7/2014 | Komatsu | G06T 7/571 348/135 |

FOREIGN PATENT DOCUMENTS

JP       2011-232330 A    11/2011

\* cited by examiner

*Primary Examiner* — Daquan Zhao
(74) *Attorney, Agent, or Firm* — Cowan, Liebowitz & Latman, P.C.

(57) ABSTRACT

An image measurement device is provided that includes at least one processor and at least one memory functioning as: a first acquisition unit that acquires a plurality of image data captured at a plurality of focus positions and at different viewpoints; a second acquisition unit that acquires distance information corresponding to each of the plurality of image data on the basis of the image data at different viewpoints at each focus position; a designation unit that designates a ranging point; a determination unit that determines reliability corresponding to the ranging point in each of the plurality of image data; and a selection unit that selects the distance information used as the distance information of the ranging point from the distance information acquired by the second acquisition unit on the basis of the reliability determined by the determination unit.

18 Claims, 22 Drawing Sheets

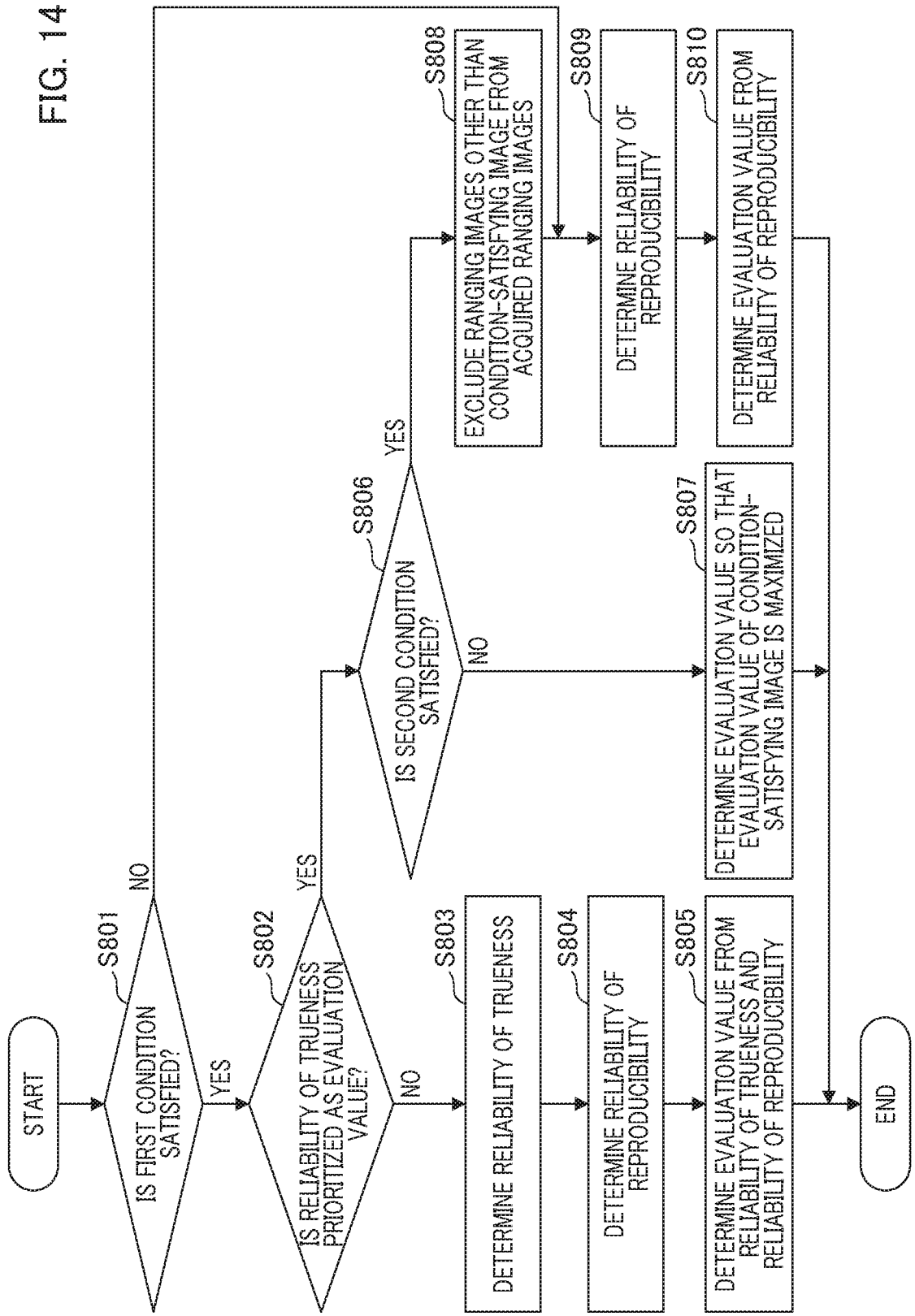

IMAGE MEASUREMENT DEVICE, IMAGE MEASUREMENT METHOD, IMAGING DEVICE

BACKGROUND OF THE INVENTION

Field of the Invention

The present invention relates to a technology for calculating a length of a subject in an image measurement device.

Description of the Related Art

A stereo camera that captures a stereoscopic image can image the same subject at the same time using two imaging units and acquire two types of images having parallax. Further, there is a method of calculating a length in a depth direction of an image on the basis of data of the two types of images captured by the stereo camera or the like. Japanese Patent Laid-Open No. 2011-232330 discloses a technology for measuring a distance between two points on a subject image (a length in a three-dimensional space) designated by a user using a stereoscopic imaging device.

On the other hand, a pupil division imaging method for dividing a light beam from a subject passing through different pupil partial areas of an imaging optical system to generate a plurality of image data having parallax in one imaging unit is known.

When a length in a depth direction is calculated for the image captured using the pupil division imaging method, there is a likelihood of degradation of accuracy when the length in the depth direction is calculated in an area in which the amount of defocus is larger than a predetermined value. This is because an image that is a target is blurred as the amount of defocus increases, and the symmetry of an image signal between a plurality of images having parallax is impaired. Therefore, a plurality of images obtained by imaging a subject that is a ranging target while changing a focus position with the same angle of view are necessary in order to more accurately measure the length in the three-dimensional space between two points designated in a subject image. For example, if a plurality of captured images are used as ranging images, it is necessary to determine whether or not a more accurate ranging value can be obtained when a length in a depth direction of one of the ranging images is used for each of the two designated points.

SUMMARY OF THE INVENTION

The present invention calculates a more accurate ranging value in an image measurement device that acquires image data and performs a measurement process.

A device according to an embodiment of the present invention is an image processing device comprising: at least one processor and at least one memory functioning as: a first acquisition unit that acquires a plurality of image data captured at a plurality of focus positions and at different viewpoints; a second acquisition unit that acquires distance information corresponding to each of the plurality of image data on the basis of the image data at different viewpoints at each focus position; a designation unit that designates a ranging point; a determination unit that determines reliability corresponding to the ranging point in each of the plurality of image data; and a selection unit that selects distance information used as distance information of the ranging point from the distance information acquired by the second acquisition unit on the basis of the reliability determined by the determination unit.

According to the present invention, it is possible to calculate a more accurate ranging value in an image measurement device that acquires image data and performs a measurement process.

Further features of the present invention will become apparent from the following description of exemplary embodiments (with reference to the attached drawings).

BRIEF DESCRIPTION OF THE DRAWINGS

FIG. 14 is a flowchart illustrating a process of determining evaluation values.

DESCRIPTION OF THE EMBODIMENTS

Hereinafter, preferred embodiments of the present invention will be described in detail with reference to the drawings. An image measurement device of each embodiment can be widely applied to an imaging device, an information processing device, or the like that acquires image data and performs a measurement process.

First Embodiment

Figure 1:
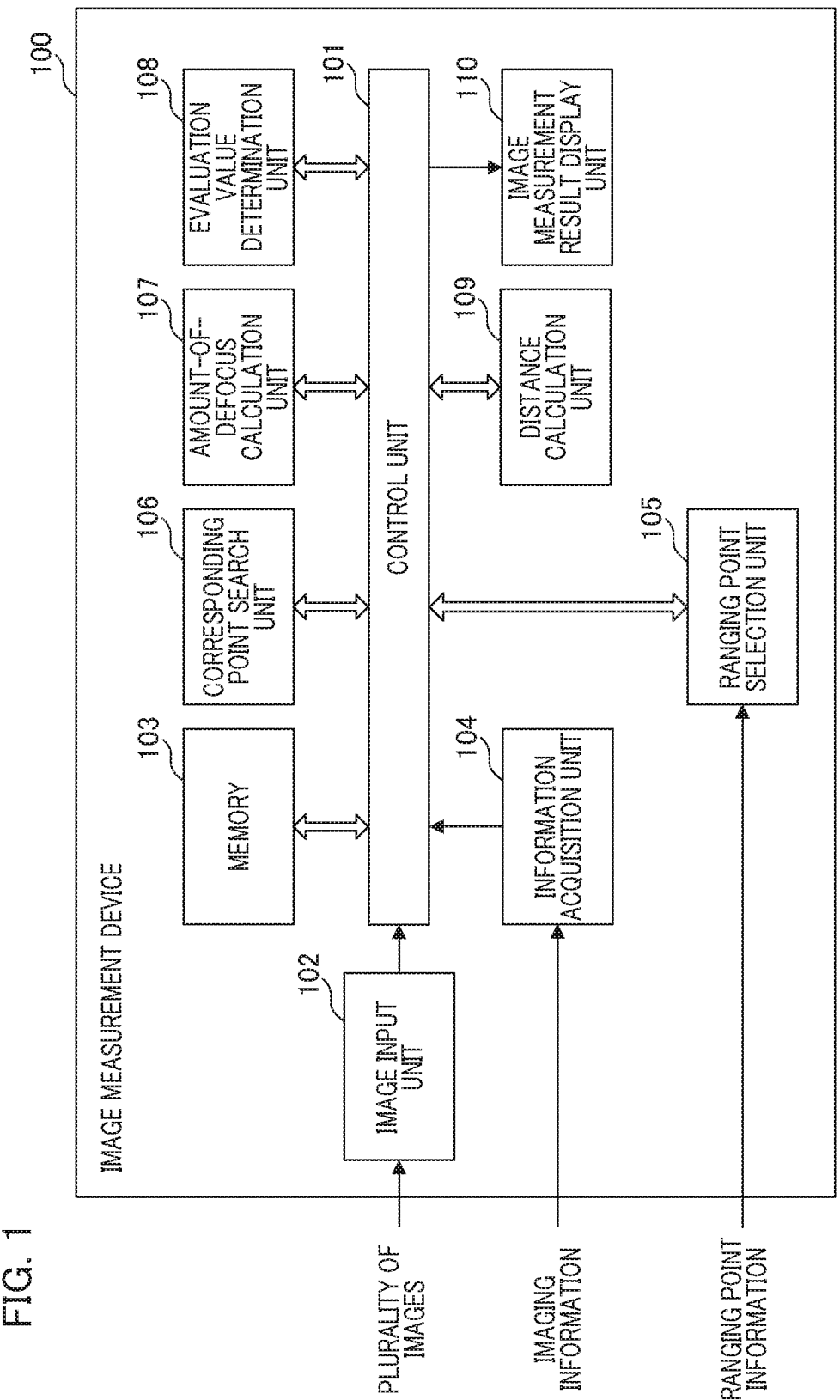
FIG. 1 is a block diagram illustrating an overall configuration of an image measurement device according to an embodiment.

FIG. 1 is a block diagram illustrating an example of a configuration of an image measurement device 100 of the embodiment. The image measurement device 100 includes a control unit 101 and respective modules (reference numerals 102 to 110), acquires image information or various pieces of information related to images, and executes a process.

The control unit 101 includes a central processing unit (CPU) and the like, and controls transmission and reception of information between the modules constituting the image measurement device 100. An image input unit 102 performs a process of storing data of a plurality of images input to the image measurement device 100 in a memory 103 according to a control instruction from the control unit 101. The memory 103 is controlled by the control unit 101, reads information necessary for a process in each module, and stores processing results from each module.

An imaging information acquisition unit 104 acquires imaging information and outputs the imaging information to the memory 103 according to a control instruction from the control unit 101. Information storage in the memory 103 is performed via the control unit 101. The imaging information is information that is generated at the time of imaging, and is associated with a plurality of images input to the image measurement device 100.

A ranging point selection unit 105 acquires ranging point information input to the image measurement device 100 and selects two ranging points for the data of the plurality of images stored in the memory 103. The ranging point selection unit 105 outputs each piece of coordinate information of the two selected points to the memory 103 according to the control instruction from the control unit 101. Each piece of coordinate information is stored in the memory 103 via the control unit 101.

A corresponding-point search unit 106 reads data of a plurality of images stored in the memory 103. A process of searching for respective ranging points corresponding to ranging points (two points) selected by the ranging point selection unit 105 is performed on the read data of the plurality of images. The corresponding-point search unit 106 calculates coordinate information corresponding to each ranging point in the plurality of images. The calculated coordinate information is stored in the memory 103 via the control unit 101.

A defocus amount calculation unit 107 reads the data of the plurality of images and the imaging information stored in the memory 103. For the data of the plurality of images, the amount of defocus at coordinates corresponding to each of the ranging points (the two points) is calculated. The calculated amount of defocus is stored in the memory 103 via the control unit 101.

An evaluation value determination unit 108 reads the data of the plurality of images, the amount of defocus, and the coordinate information corresponding to the ranging points (the two points) in the plurality of images stored in the memory 103. An evaluation value of the coordinates corresponding to each ranging point in the plurality of images is determined. The determined evaluation value is stored in the memory 103 via the control unit 101.

A ranging point distance calculation unit 109 reads the evaluation value and the amount of defocus stored in the memory 103. The image to be used is determined from among the plurality of images on the basis of the read evaluation value. A process of calculating the coordinates of each ranging point in a three-dimensional space on the basis of the amount of defocus at the ranging points (the two points) in the determined image is performed. The ranging point distance calculation unit (hereinafter simply referred to as a distance calculation unit) 109 calculates a length between the ranging points from the coordinates of the respective ranging points in the three-dimensional space. Information on the calculated length is stored in the memory 103 via the control unit 101.

An image measurement result display unit (hereinafter simply referred to as a display unit) 110 displays an image measurement result on a screen to present the image measurement result to the user on the basis of the data of the plurality of images, the coordinate information of the ranging points, and the length information between the ranging points read from the memory 103. For a representative image selected from among the plurality of images, the coordinates of the two points which are the ranging points and the length between the two points are displayed on the display unit 110.

Figure 2A:
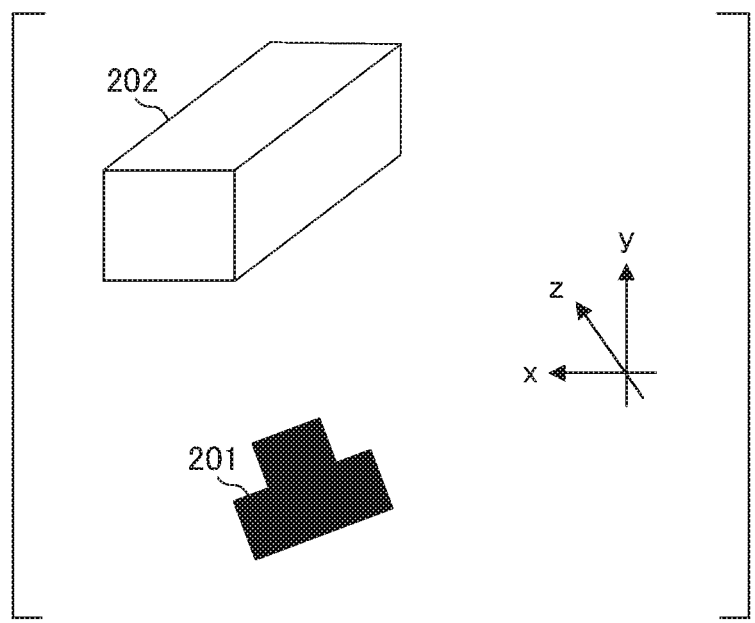
FIGS. 2A and 2B are diagrams illustrating a plurality of images in the embodiment.

The plurality of images input to the image measurement device 100 will be described in detail with reference to FIGS. 2A and 2B. FIG. 2A is a schematic diagram illustrating a positional relationship between the imaging device and the subject. The imaging device 201 includes a pupil division imaging unit. For example, it is possible to generate first and second viewpoint images as a plurality of images with parallax (parallax images) by receiving, from a subject, a light beam passing through a pupil partial area of an imaging optical system in a 2-division manner. It is assumed that the imaging device 201 can image the subject 202 while changing a focus position corresponding to an in-focus position or a depth of field to acquire data of a plurality of images. That is, a pair of image data of a plurality of parallax images are acquired at a plurality of focus positions. For the imaging device 201 in FIG. 2A, a horizontal direction is defined as an x axis direction, a vertical direction is defined as a y axis direction, and a depth direction is defined as a z axis direction. The depth direction is a direction along an optical axis of the imaging device 201.

Figure 2B:
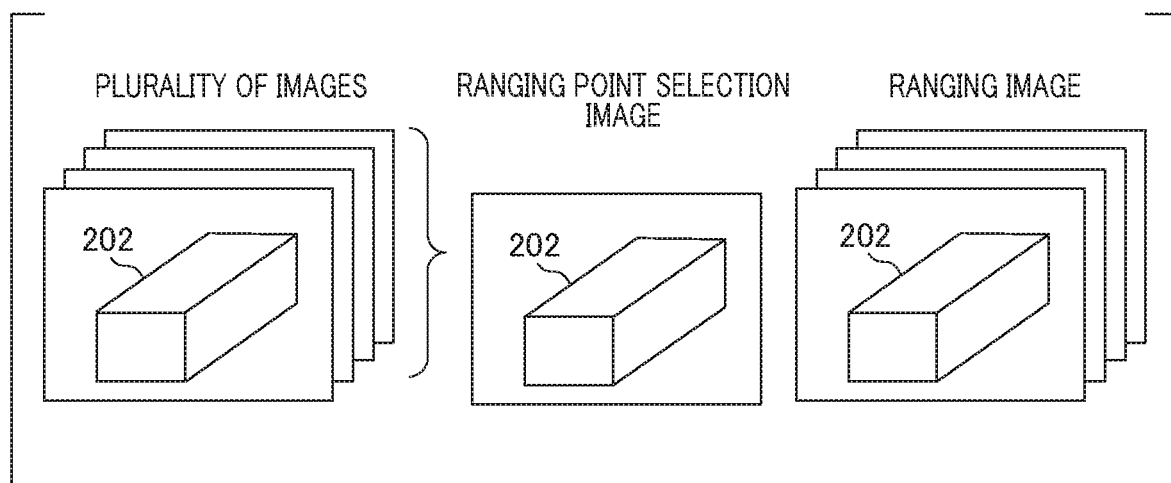

FIG. 2B is an illustrative diagram of the plurality of images captured by the imaging device 201. As illustrated in FIG. 2A, imaging is performed according to a positional relationship between the imaging device 201 and the subject 202. The plurality of captured images include a ranging point selection image and a ranging image. The ranging point selection image is an image acquired through imaging with a deep depth of field in order to select the ranging points. Further, the ranging image is an image captured with the focus position changed with respect to the same subject. The ranging point selection image is an image with a wide in-focus area relative to the ranging image. Further, for the ranging point selection image, one specific ranging image is selected from among the ranging images, and such a ranging point selection image can be used as the ranging image. Further, when there is no image with a wide in-focus area relative to the ranging image, it is also possible to arbitrarily select one ranging point selection image from the ranging images.

Figure 3:
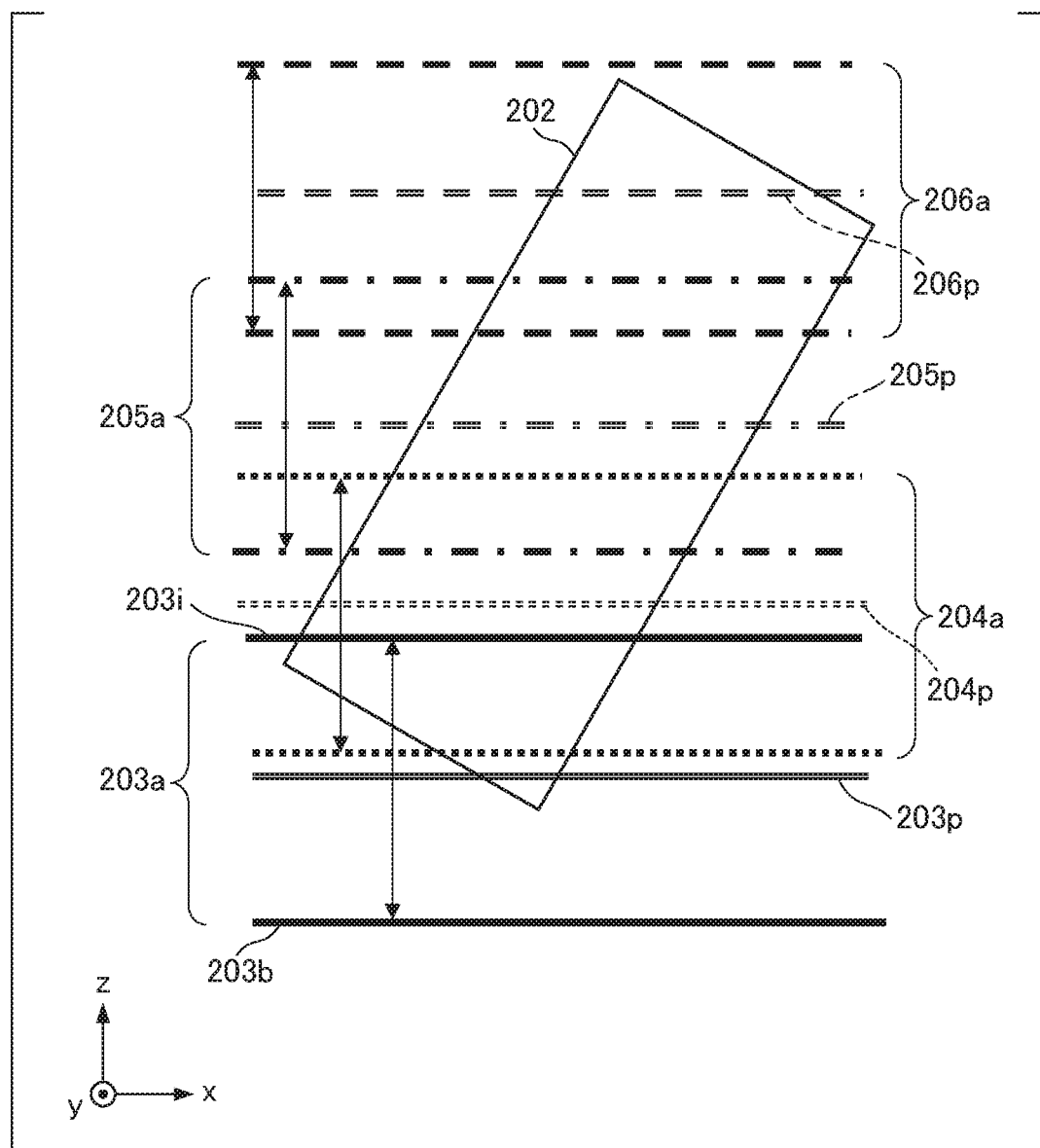
FIG. 3 is a diagram illustrating an effective ranging range of each image.

FIG. 3 is a diagram illustrating an effective ranging range of each ranging image. An effective ranging range of each of a plurality of ranging images captured by changing a focus position by overlooking the subject 202 from the y axis direction in the positional relationship between the imaging device 201 and the subject 202 illustrated in FIG. 2A is illustrated. An axis perpendicular to a plane of the paper in FIG. 3 is defined as a v axis, and two axes orthogonal to each other in the plane of the paper are defined as x and z axes. The focus position can be represented as a focus surface with respect to the z axis by overlooking from the y axis direction. For the plurality of ranging images captured while changing the focus position, focus surfaces in each ranging image is defined as a focus surface 203p, a focus surface 204p, a focus surface 205p, and a focus surface 206p in order from a side closest to a camera position. In this case, in each focus surface, an effective ranging range on the front side from the focus surface and an effective ranging range on the rear side are shown. For example, in the focus surface 203p, the effective ranging range on the front side from the focus surface 203p is a range from the focus surface 203p to a position 203b indicating the effective ranging range. Further, the effective ranging range on the rear side from the focus surface 203p is a range from the focus surface 203p to a position 203i indicating the effective ranging range. A range from the position 203b indicating the effective ranging range on the front side to the position 203i indicating the effective ranging range on the rear side is an effective ranging range 203a in the focus surface 203p. Similarly, effective ranging ranges of the focus surfaces 204p, 205p, and 206p are ranges 204a, 205a, and 206a, respectively. The effective ranging range is a range in which the effectiveness of the ranging accuracy in the depth direction with the focus position as the center is high, and can be determined on the basis of the amount of defocus to be described below. That is, the ranging accuracy outside the effective ranging range becomes much lower than the ranging accuracy in the effective ranging range.

Figure 4:
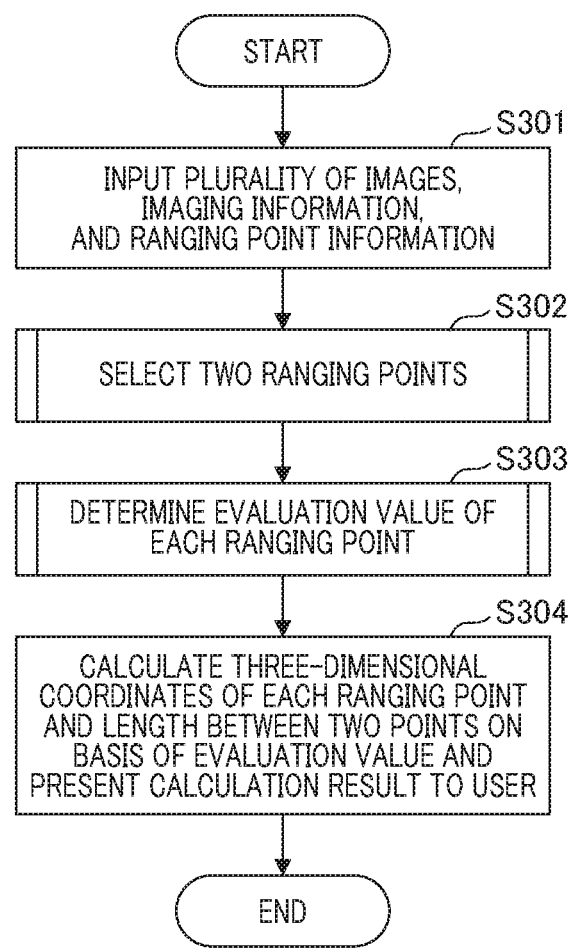
FIG. 4 is a flowchart illustrating an entire image measurement process.

A process that is performed by the image measurement device 100 will be described in detail with reference to the flowchart illustrated in FIG. 4. In S301, information on a plurality of images, imaging information, and ranging point information are acquired and input to the image measurement device 100. The plurality of images include the ranging point selection image and the ranging image, and the image input unit 102 acquires the images. As the imaging information, at least information (a) to (h) below is acquired by the imaging information acquisition unit 104 for each of the plurality of images.

(a) A distance from the imaging device to the focus position
(b) A pixel pitch of the imaging element
(c) A conversion coefficient determined by a magnitude of an opening angle of a centroid of a light beam passing through a pair of ranging pupil areas
(d) An F-number
(e) A pupil distance
(f) A distance from an image principal point in a lens of the imaging device to an imaging sensor surface
(g) A distance from an object principal point in the lens of the imaging device to the subject
(h) Lens state information (local length and lateral magnification ratio) of the imaging device The imaging information is necessary when the amount of defocus is calculated or when the coordinates in the three-dimensional space are calculated.

The ranging point information is information for determining whether or not the ranging point selection method is automatically performed or whether or not the user arbitrarily selects the ranging point selection method, and is acquired by the ranging point selection unit 105. Further, when the ranging point selection method is automatically determined, the ranging point information includes information on a method of determining the ranging point selection method.

In the next S302, a process of selecting the ranging points (two points) is executed. Details of the process will be described below with reference to FIG. 5. In S303, a process of determining an evaluation value of each ranging point is executed. Details of the process will be described below with reference to FIG. 7. In S304, a process of calculating three-dimensional coordinates of each ranging point and a length between the two points is executed on the basis of the evaluation value determined in S303, and a calculation result is presented to the user. An evaluation method will be described below with reference to FIG. 16. After S304, the process ends.

Figure 5:
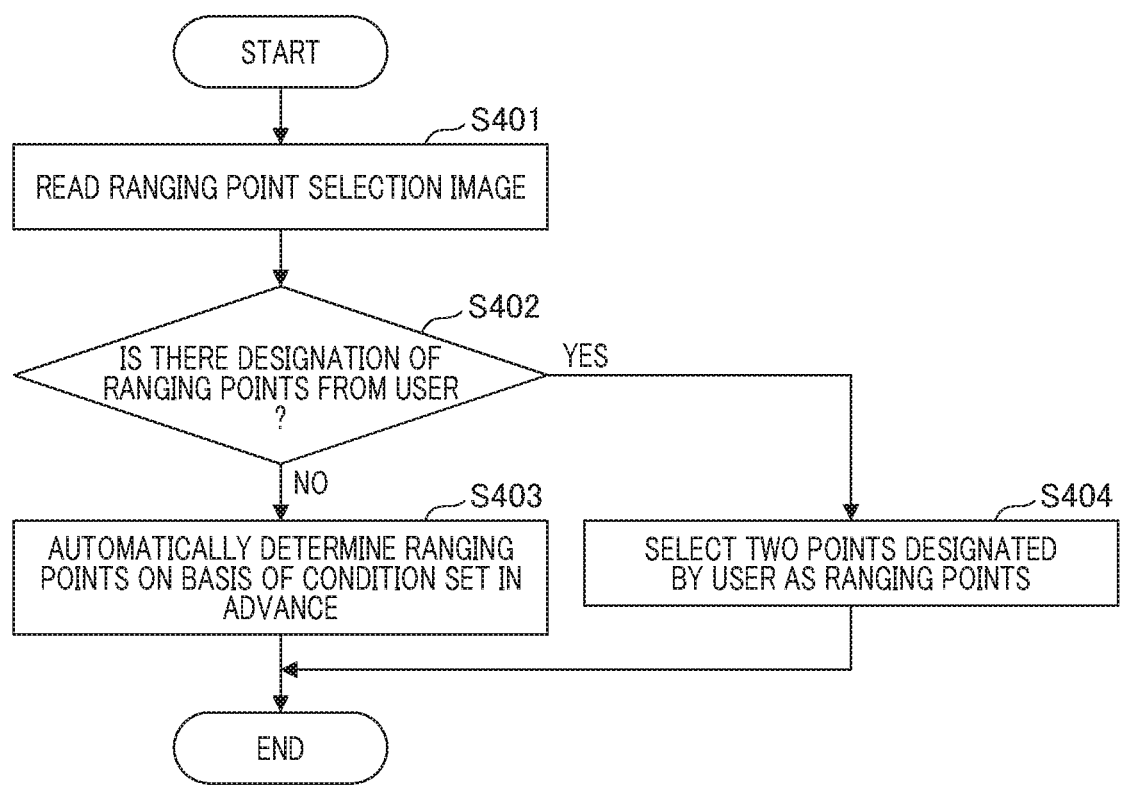
FIG. 5 is a flowchart illustrating a ranging point selection process.

A ranging point selection process in the ranging point selection unit 105 will be described with reference to FIG. 5. FIG. 5 is a flowchart illustrating the ranging point selection process. In step S401, a process of reading data of the ranging point selection image is performed. In the next S402, a process of determining whether or not there is designation of the ranging point from the user is executed with reference to the ranging point information. If the designation of the ranging point by an operation of the user is not performed, the process proceeds to S403. If the designation of the ranging point by an operation of the user is performed, the process proceeds to S404.

Figure 6A:
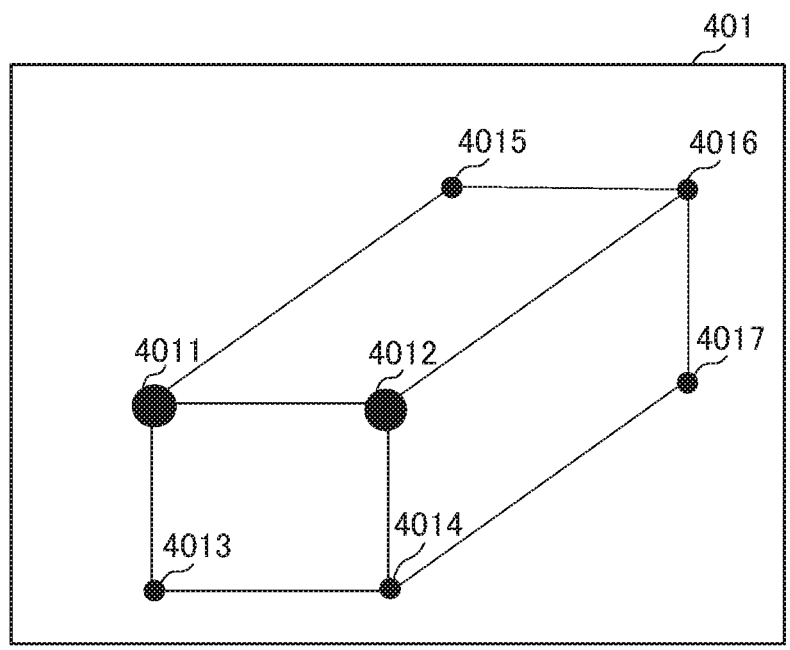
FIGS. 6A and 6B are diagrams illustrating examples of selection of ranging points.

In step S403, the ranging point is automatically determined on the basis of the condition set using the ranging point information in advance. A specific example will be described with reference to FIG. 6A. FIG. 6A is a schematic diagram illustrating feature point detection and evaluation value calculation. First, the feature point detection is performed on the ranging point selection image 401. For example, feature points 4011 to 4017 of a rectangular parallelepiped subject are obtained. In this case, an evaluation value at a point detected as the feature point is calculated, and the amount of feature of the feature point is evaluated. In FIG. 6A, the feature point (a black point) is displayed larger as the amount of feature of the feature point is larger. That is, it is assumed that a radius of a black point mark indicating the feature point displayed in the ranging point selection image 401 increases as the amount of feature is larger. For example, the feature points 4011 and 4012 among the feature points 4011 to 4017 have larger amounts of feature than the other feature points 4013 to 4017. In this case, the feature points 4011 and 4012 are determined as two ranging points. Further, examples of a method of detecting feature points include a corner detection method, a contrast detection method, and an edge detection method. There are a method of using these methods separately and a method of calculating feature points in combination among a plurality of methods.

Figure 6B:
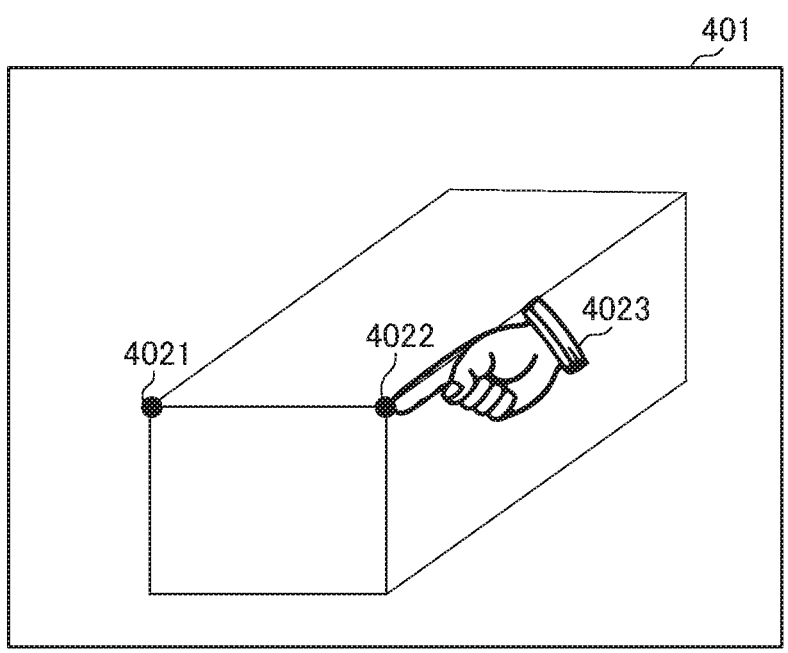

In S404 of FIG. 5, two points designated by the user are selected as the ranging points on the basis of the conditions set using the ranging point information in advance. A specific example will be described with reference to FIG. 6B. FIG. 6B is a schematic diagram illustrating a selection operation of the user. An example in which the user instructs ranging points 4021 and 4022 with respect to the ranging point selection image 401 is shown. The user can perform an operation of selecting a desired ranging point with a finger on a touch panel or an instruction operation using a pointing device or a cursor symbol 4023. Accordingly, two ranging points are selected. Further, in addition to the example illustrated in FIG. 6B, it is possible for the user to select coordinates on an image and to use a point corresponding to the selected coordinates as the ranging point. Accordingly, the user can freely select the ranging points and time and effort of the user can be reduced in the case of automatic selection of the ranging points.

Figure 7:
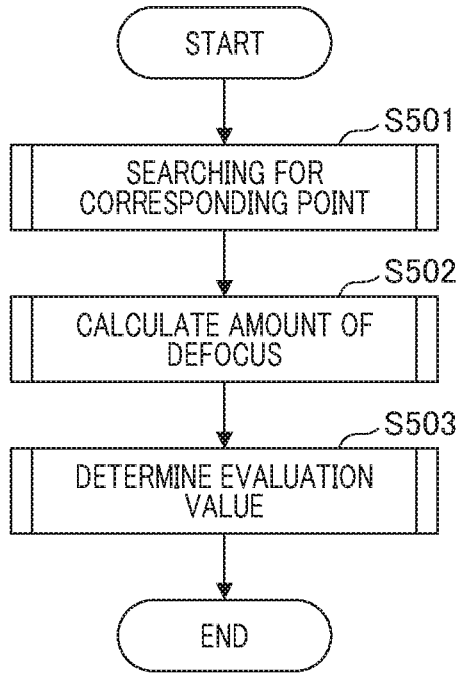
FIG. 7 is a flowchart illustrating a method of determining an evaluation value.

Next, a process (S303 in FIG. 4) of determining the evaluation value of each ranging point will be described with reference to the flowchart of FIG. 7. In S501, in order to search for a corresponding point in the ranging image, a corresponding point search is performed on the ranging point selected in the ranging point selection image. In step S502, a process of calculating the amount of defocus at the corresponding point that has been found through the search is performed. In step S503, the evaluation value at the ranging point is determined on the basis of the calculated amount of defocus and reliability. Details of the process shown in each step of FIG. 7 will be described below.

Figure 8:
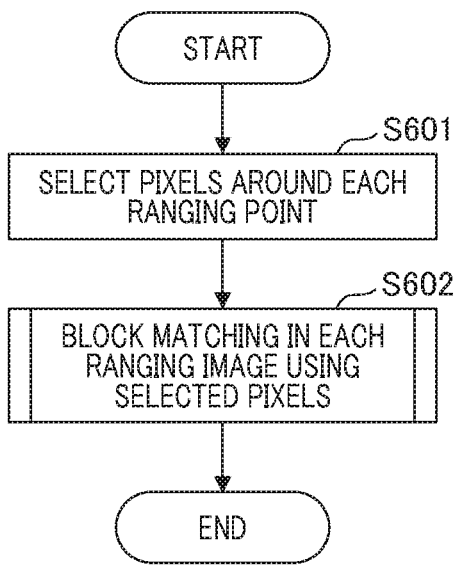
FIG. 8 is a flowchart illustrating a method of searching for a corresponding point.

First, in S501, since it is necessary to specify, in a plurality of ranging images, coordinates of the ranging points (two points) selected in the ranging point selection image, corresponding point search processing is performed. A process that is performed by the corresponding-point search unit 106 will be described in detail with reference to the flowchart of FIG. 8.

In step S601, a process of selecting pixels around each ranging point in the ranging point selection image is performed. In step S602, a block matching process is executed in each ranging image using the selected nearby pixels. A specific example will be described with reference to FIG. 9A.

Figure 9A:
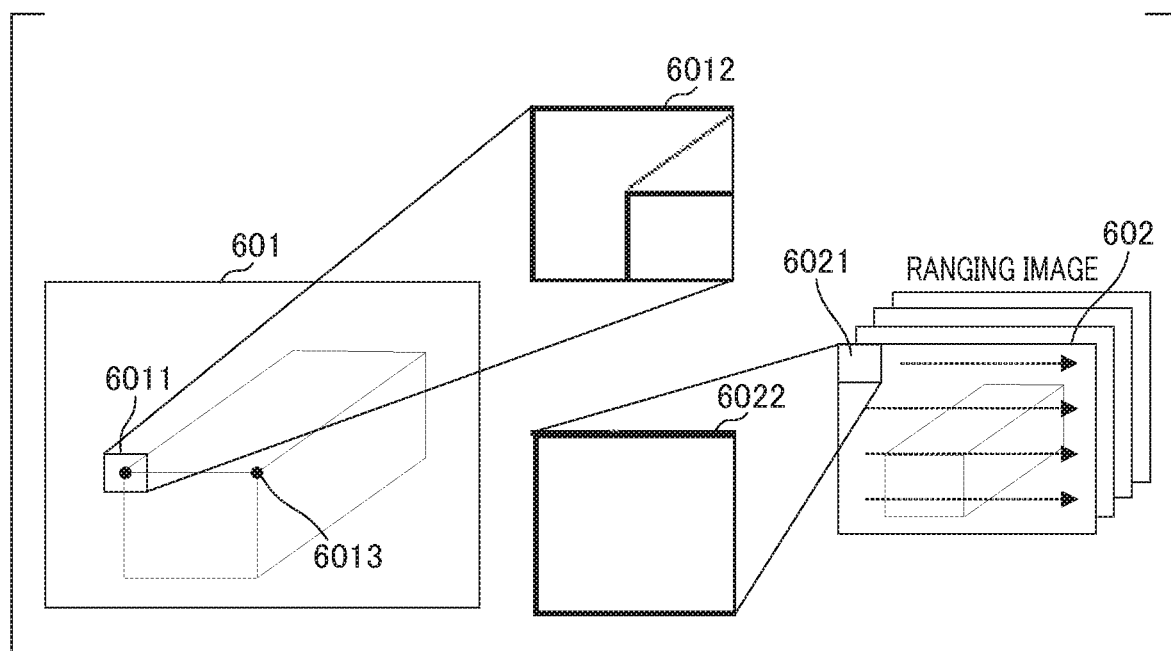
FIGS. 9A and 9B are schematic diagrams illustrating the method of searching for a corresponding point.

FIG. 9A is a schematic diagram illustrating the corresponding point search, and illustrates a ranging point selection image 601 and a ranging image 602. In the ranging point selection image 601, a process of selecting pixels around a ranging point 6011 as a correlation window 6012 is first performed. The correlation window 6012 is shown in an enlarged view. Further, a process of selecting a correlation window 6022 selected in a window range 6021 is performed on the ranging image 602. The selected correlation window 6022 is shown in an enlarged view. A block matching process is performed on the correlation window 6012 and the correlation window 6022. That is, a process of calculating the amount of error between the correlation windows is executed, and this process is repeatedly performed over the entire image while changing a position of the window range 6021. It is possible to calculate a ranging point in the ranging image 602 corresponding to the ranging point selected in the ranging point selection image 601 from coordinates of a range in which the calculated amount of error is smallest. For the ranging point 6013, a ranging point corresponding to the ranging point selected in the ranging point selection image in each ranging image is calculated, as in the ranging point 6011.

Figure 9B:
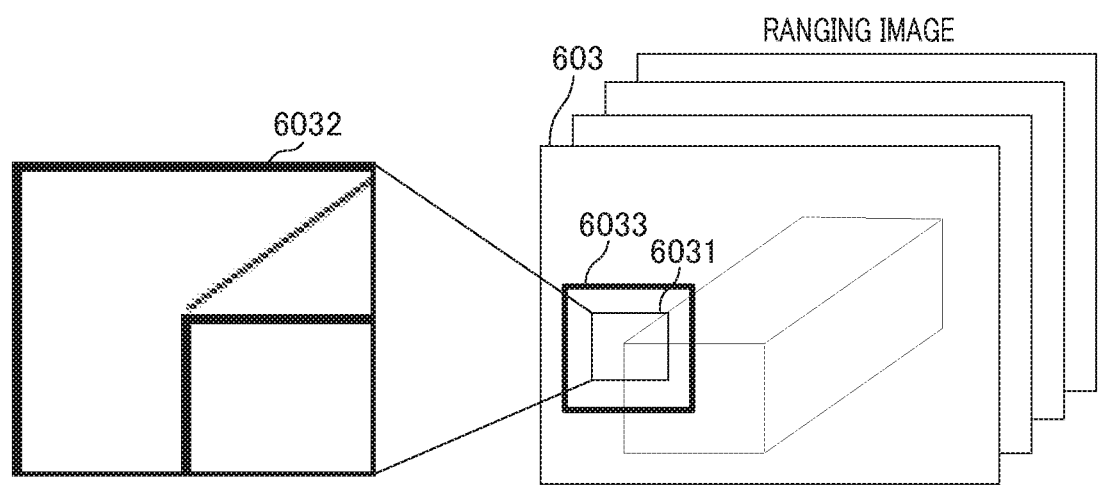

FIG. 9B is an illustrative diagram of a method of improving the block matching process. An example of a method for the block matching process described with reference to FIG. 9A may include a method of reducing the amount of calculation by narrowing down a search range in an image. That is, in FIG. 9A, the entire ranging image 602 is set as the search range, whereas in FIG. 9B, the fact that a ranging image 603 is an image captured by changing a focus position with respect to the ranging point selection image is used. Coordinates of the ranging point in the ranging point selection image are less likely to greatly deviate from coordinates of a ranging point in the ranging image 603. Using this characteristic, a process of selecting a correlation window 6032 is performed with a start position of a window range 6031 in the ranging image 603 set as the coordinates of the ranging point in the ranging point selection image. Further, a range in which the position of the window range 6031 is changed is limited in a window movement range 6033. Accordingly, it is possible to eliminate waste of a process due to searching for an area with low correlation and to greatly reduce the amount of calculation.

Figure 10:
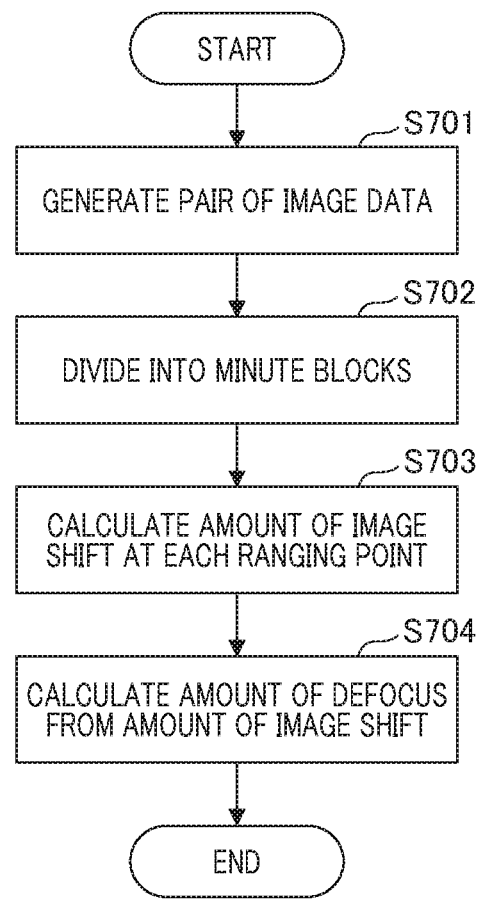
FIG. 10 is a flowchart illustrating a method of calculating the amount of defocus.

The process of calculating the amount of defocus shown in S502 of FIG. 7 will be described in detail with reference to FIG. 10. FIG. 10 is a flowchart illustrating a process that is performed by the defocus amount calculation unit 107. In step S701, a process of generating a pair of image data from one ranging image is performed. Details will be described in detail with reference to FIGS. 11A and 11B.

Figure 11B:
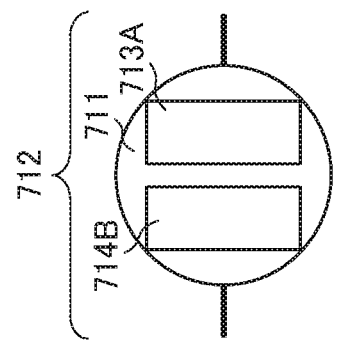
FIGS. 11A and 11B are diagrams illustrating a pixel structure of an imaging unit.
Figure 11A:
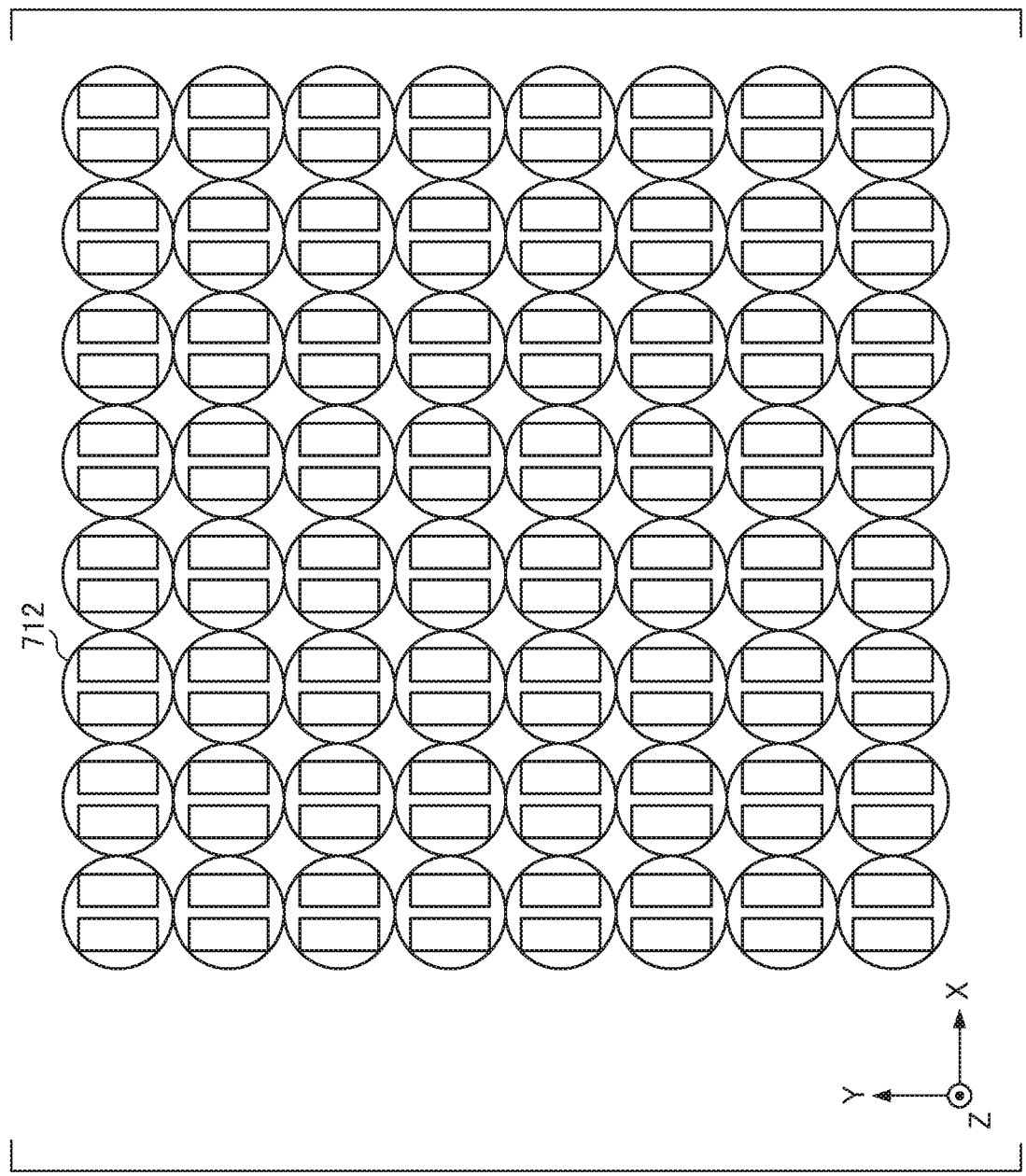

FIG. 11A is a schematic diagram illustrating a pixel arrangement of an imaging element that is used when imaging of a parallax image is performed. An axis perpendicular to a plane of the drawing is a Z axis, and two axes orthogonal to each other in a plane of the paper are X and Y axes. An imaging element constituting the imaging unit has a structure in which a large number of pixel units 712 are arranged regularly in a two-dimensional array. FIG. 11B is an enlarged view showing one of the pixel units 712. The pixel unit 712 includes a microlens 711, and a pair of photoelectric conversion units 713A and 714B (hereinafter referred to as pupil division pixels 713A and 714B). The plurality of photoelectric conversion units corresponding to each microlens receive a light beam from a subject passing through different pupil partial areas of an imaging optical system, perform photoelectric conversion, and output an electric signal. In the embodiment, an image acquired by the pupil division pixel 713A is referred to as an image A, and an image acquired by the pupil division pixel 714B is referred to as an image B. An image obtained by combining the image A and the image B is called an image AB. The image AB corresponds to an image that is captured by an imaging element which is not a pupil division type.

In the configuration illustrated in FIGS. 11A and 11B, data of the image A and the image B can be acquired as information necessary for performing an image measurement process. Further, in this example, the number of divisions of the photoelectric conversion unit is 2, but the number of divisions may be 3 or more, and it is possible to acquire a plurality of viewpoint images with different viewpoints.

Figure 12A:
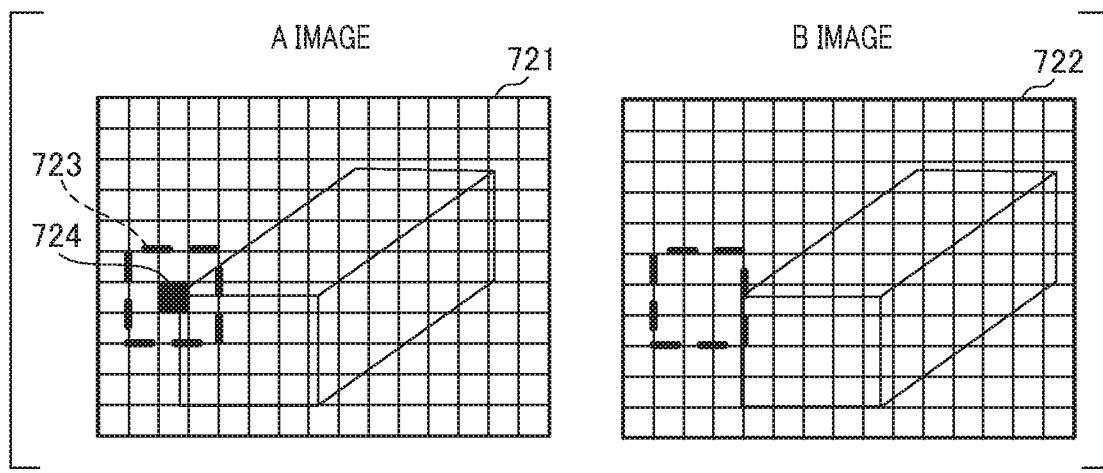
FIGS. 12A to 12C are schematic diagrams illustrating an image division process and a process of calculating the amount of image shift.

In S702 of FIG. 10, a process of dividing the pair of image data generated in S701 into minute blocks is performed. A specific example will be described with reference to FIG. 12A. FIG. 12A is a schematic diagram illustrating data of an image A 721 and an image B 722 generated from signals respectively acquired by the pupil division pixels 713A and 714B. The image A 721 and the image B 722 are divided into a plurality of blocks as indicated by a minute block 723. For example, for each pixel of the input image, a pixel of interest is set at a center position of the minute block. The minute block 723 in FIG. 12A is divided to include a pixel of interest at a ranging point 724 at a center thereof, and eight pixels around the pixel of interest.

Figure 12B:
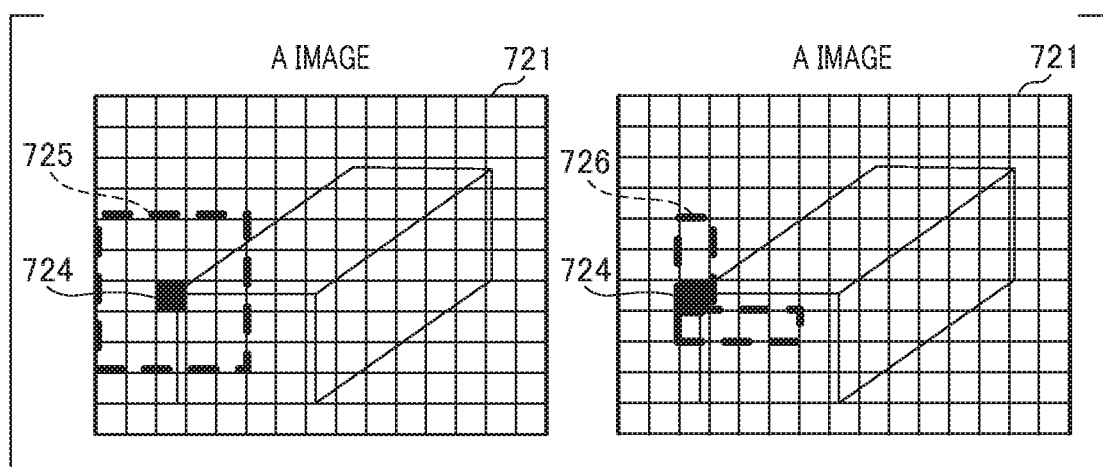

FIG. 12B is a schematic diagram illustrating the image A 721 in order to explain a shape of the minute block. A minute block 725 shown in the left drawing is an example of a block that is larger in size than the minute block 723 in FIG. 12A. Further, a minute block 726 shown in a right drawing is an example of an L shape. Thus, it is assumed that there is no limitation on the sizes and shapes of the divided minute blocks. Further, areas of adjacent minute blocks may overlap each other.

In S703 of FIG. 10, a correlation calculation process is performed on the minute blocks divided in S702, and the amount of image shift at each ranging point is calculated. Specifically, the pieces of pixel data in the pair in the minute block are expressed as E(1) to E(m) and F(1) to F(m). m indicates the number of pieces of data. In this case, the amount of correlation C(k) at the amount of shift (indicated as k) between two data strings is calculated using Equation (1) below while relatively shifting the second data series F(1) to F(m) with respect to the first data series E(1) to E(m).

$$C(k)=\Sigma|E(n)-F(n+k)| \qquad (1)$$

In Equation (1), ∥ is an absolute value symbol, and Σ calculation (integration) is calculated for n. In this Σ calculation, a range of n and n+k is limited to a range of 1 to m. A value of the amount of shift k is an integer and is the amount of relative shift with a detection pitch of a pair of image data as a unit.

Figure 12C:
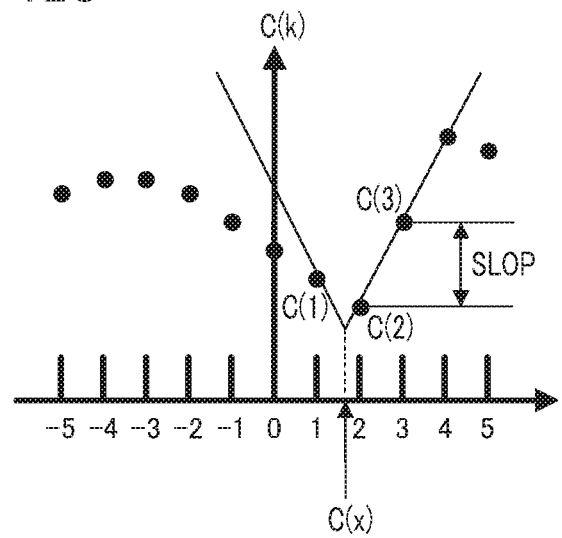

An example of a calculation result of Equation (1) will be described with reference to a graph illustrated in FIG. 12C. In FIG. 12C, a horizontal axis indicates the amount of image shift and a vertical axis indicates the amount of correlation C(k). The amount of correlation C(k) is minimized at the amount of image shift with high correlation between a pair of data series. The amount of image shift (denoted with x) giving a minimum value C(x) for the amount of continuous correlation is calculated using a three-point interpolation method according to Equations (2) to (5) below. The value of the amount of image shift x is a real number.

$$x=kj+D/SLOP \qquad (2)$$

$$C(x)=C(kj)-|D| \qquad (3)$$

$$D=\{C(kj-1)-C(kj+1)\}/2 \qquad (4)$$

$$SLOP=\mathrm{MAX}\{C(kj+1)-C(kj),\,C(kj-1)-C(kj)\} \qquad (5)$$

Here, kj is k when a discrete amount of correlation C(k) is minimized.

The amount x obtained from Equation (2) is the amount of image shift in the pair of pupil division images. A unit of the amount of image shift x is pixels.

In S704 of FIG. 10, the amount of defocus (denoted with DEF) with respect to a scheduled imaging plane of a subject image plane is calculated using Equation (6) below from the amount of image shift x at the ranging point obtained using Equation (2).

$$DEF=KX \cdot PY \cdot x \qquad (6)$$

In Equation (6), PY is a pixel pitch of the imaging element (an inter-pixel distance of pixels constituting the imaging element). KX is a conversion coefficient that is determined by a magnitude of an opening angle of a centroid of a light beam passing through a pair of ranging pupil partial areas, and a unit thereof is mm/pixel. Further, the magnitude of the opening angle of this centroid changes according to a size (F-number) of the aperture opening of the lens and is determined according to lens information. This will be described in detail with reference to FIG. 13.

Figure 13:
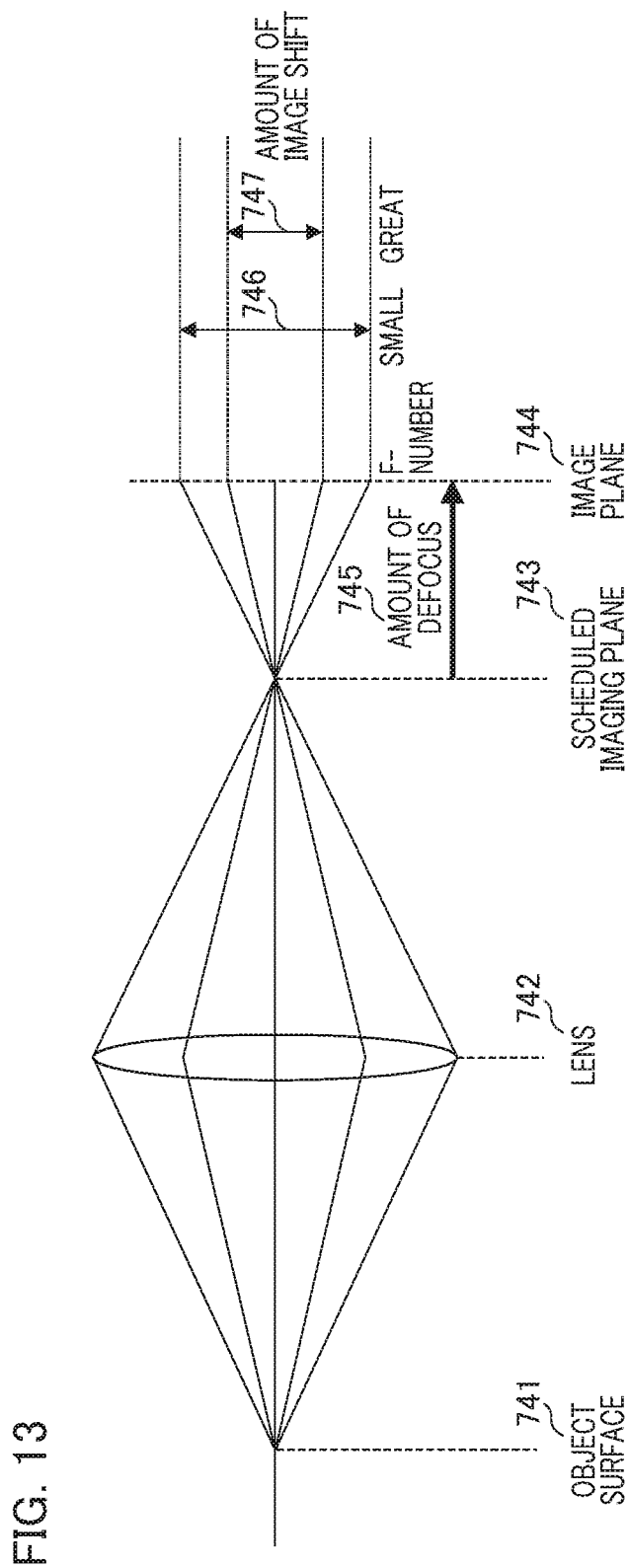
FIG. 13 is a schematic diagram illustrating a relationship among the amount of defocus, an F-number, and the amount of image shift.

FIG. 13 is a schematic diagram illustrating a relationship among the amount of defocus, the F-number, and the amount of image shift with respect to the scheduled imaging plane. An object surface 741 of an imaging target, a lens 742, a scheduled imaging plane 743 of the imaging element, and an image plane 744 are shown in an order from the left side of FIG. 13. The image plane 744 is a plane that is at a position corresponding to the amount of defocus 745 from the scheduled imaging plane 743. The amounts of image shift 746 and 747 according to the F-number are shown. The amount of image shift 746 is the amount of image shift when the F-number is small (an open side), and the amount of image shift 747 is the amount of image shift when the F-number is great (an aperture side). It can be seen that the amount of image shift with respect to the image plane in a defocused state increases on the open side and decreases on the aperture side. In other words, even when the amount of defocus is the same, the amount of image shift differs depending on the F-number. Therefore, when the amount of defocus is calculated from the amount of image shift, it is necessary to multiply a conversion coefficient KX which is a gain according to the F-number, as shown in Equation (6).

As described above, it is possible to calculate the amount of defocus by performing repeated calculation while shifting the position of the pixel of interest pixel by pixel. By applying this calculation processing method to the ranging points (two points) of each ranging image, it is possible to calculate the amount of defocus of each ranging image.

The evaluation value determination process shown in S503 of FIG. 7 will be described with reference to FIG. 14. FIG. 14 is a flowchart illustrating a process that is performed by the evaluation value determination unit 108. S801 is a judgment process regarding a first condition. The first condition is that there is a ranging image in which two points serving as ranging points are within an effective ranging range of one image (hereinafter referred to as a condition-satisfying image). If the first condition is satisfied, the process proceeds to S802, and the first condition is not satisfied, the process proceeds to S809. Here, the effective ranging range will be described in detail. The presence or absence of the condition-satisfying image can be determined by evaluating the amount of defocus DEF calculated using Equation (6). That is, as the amount of defocus DEF increases, ranging accuracy of the DEF decreases. A range of the amount of defocus DEF in which the ranging accuracy above a certain level is guaranteed is defined as |DEF|<Cr. Cr is a threshold value of the amount of defocus. When the amount of defocus DEF satisfying the inequality |DEF|<Cr has been calculated at the ranging point, this ranging point is determined to be in the effective ranging range. That is, it is possible to determine whether or not there is the condition-satisfying image on the basis of whether or not the magnitude of the amount of defocus DEF at the ranging point is smaller than the predetermined threshold value Cr. It is possible to evaluate whether or not there is the condition-satisfying image on the basis of the amount of defocus calculated for each ranging point of a plurality of ranging images.

As described above, the amount of defocus changes according to the size (F-number) of the aperture opening. Referring to FIG. 13, specifically, for a first ranging image in which the F-number is set to a great value, the effective ranging range can be widened relative to a second ranging image in which the F-number is set small. However, in the first ranging image, the ranging accuracy decreases. Using this characteristic, when there is a ranging image in which the F-number is increased, provisional ranging of ranging points (two points) is performed in the ranging image, such that a determination can be made as to whether or not two ranging points are in the effective ranging range of one image. Thus, it is possible to reduce the amount of calculation and a calculation time as compared with the process of evaluating whether or not the two ranging points in each of the ranging images are in the effective ranging range.

In S802 of FIG. 14, it is determined whether to prioritize a reliability of trueness as the evaluation value. The trueness means a degree corresponding to a measurement error from a true value, and the reliability is higher as a measured value is closer to the true value. The reliability of the trueness is determined by evaluating the amount of movement of the focus. The amount of movement of focus means the amount of movement of the focus between the respective ranging images in a case in which the ranging images for calculating the depth information at two points that are ranging points are selected. When the amount of movement of the focus is large, a measurement error of a distance up to a focus position at the time of imaging a plurality of images increases. In a performance method in which the reliability of the trueness is always prioritized as the evaluation value without determining whether or not the reliability of the trueness is prioritized as the evaluation value, the evaluation value is calculated using only the amount of movement of the focus regardless of whether image quality is good or bad. An event occurring in this case is a decrease in ranging accuracy. For example, in the case of an image with low contrast at the ranging point or an image in which a luminance value at the ranging point is saturated, the image is selected as the ranging image due to a small amount of movement of the focus, and the ranging accuracy is likely to be degraded. On the other hand, in a performance method in which the reliability of the trueness is not prioritized as the evaluation value, it is necessary to calculate or determine all other evaluation values, and a burden on a calculation process is likely to increase. For the above reasons, it is determined in S802 whether the reliability of the trueness is prioritized as the evaluation value, and if the reliability of the trueness is not prioritized as the evaluation value, the process proceeds to S803, and if the reliability of the trueness is prioritized as the evaluation value, the process proceeds to S806. Example of a determination method may include a user-based method and a device-based method as follows.

Method by which a user performs an operation and performs arbitrary setting

A device performs a priority determination according to a setting instruction that the user has performed using an operation unit.

Method by which the device automatically performs determination

For example, if an imaging interval (a time interval) is equal to or greater than a certain time (a threshold time) on the basis of a length of the imaging interval in capturing of a plurality of images, the device automatically determines that the reliability of the trueness is not prioritized as the evaluation value.

Further, each method may be performed independently or a plurality of methods may be selectively used according to conditions.

In S803, the reliability of the trueness of accuracy in each ranging image of the ranging points (two points) is determined by evaluating the amount of movement of the focus. If the amount of movement of the focus is large, a measurement error of the distance up to the focus position at the time of imaging a plurality of images increases. Therefore, the evaluation value determination unit 108 reduces the evaluation value of the amount of movement of the focus. Further, if the ranging images for calculating depth information at the ranging points (two points) are the same ranging images, the amount of movement of the focus is zero. In such a case, the evaluation value determination unit 108 increases the evaluation value of the focus movement. A specific example will be described with reference to FIG. 15A.

Figure 15A:
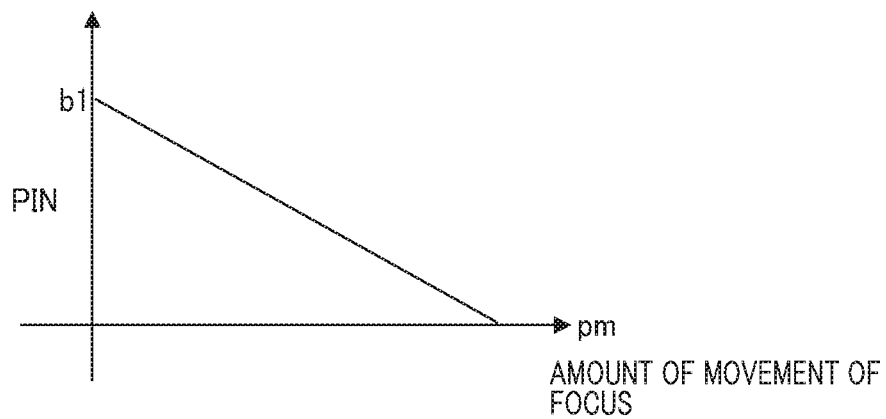
FIGS. 15A to 15D are graphs illustrating various evaluation values.

FIG. 15A is a graph illustrating a relationship between the amount of movement of the focus and the corresponding evaluation value. A horizontal axis indicates the amount of movement of the focus (denoted with pm), and a vertical axis indicates the evaluation value (denoted with PIN). The evaluation value PIN decreases as the amount of movement of the focus pm increases. For example, the evaluation value PIN is calculated using Equation (7).

$$PIN = b1 - b2 \times pm \qquad (7)$$

Here, an intercept b1 and a coefficient b2 are both positive values (b1, b2>0) and can be arbitrarily set. If the amount of movement of the focus pm is not evaluated, PIN is as shown in Equation (8), $$PIN = b3 \qquad (8).$$

b3 is a constant value (a positive value) and can be arbitrarily set.

The reliability of the accuracy in each ranging image is denoted with Rs, $$Rs = PIN \qquad (9).$$

When the amount of movement of the focus pm is evaluated, the reliability Rs can be determined to decrease as a value of pm increases. Accordingly, since a measurement error caused by movement of the focus can be reduced, a more accurate ranging value can be calculated. Further, it is possible to determine the evaluation value PIN by providing a reference table on the basis of parameters, in addition to calculating the evaluation value PIN as shown in Equations (7) and (8). Further, the reliability Rs of the trueness can be determined from a relationship between the amount of movement pm of focus and the evaluation value PIN by providing a reference table based on parameters instead of being calculated using Equation (9).

In step S804 of FIG. 14, the reliability of reproducibility in each of the ranging images of the two ranging points is determined. The reliability of the reproducibility is reliability that is determined by evaluating the amount of defocus or the amount of image shift, the luminance value, and the dispersion value at each of the two ranging points. This will be described in detail with reference to FIGS. 15B to 15D.

Figure 15B:
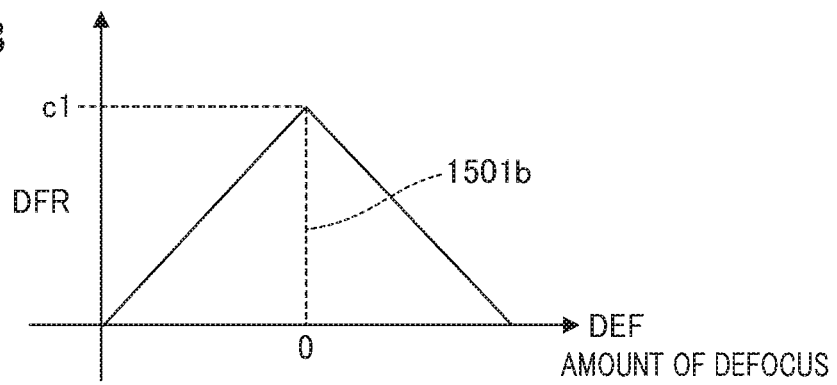

FIG. 15B is a graph illustrating the reliability of the reproducibility based on the evaluation value of the amount of defocus. For the amount of defocus DEF shown on a horizontal axis, an evaluation value thereof is denoted with DFR and shown on a vertical axis. The image blur increases as the absolute value |DEF| of the amount of defocus increases, and therefore, ranging accuracy decreases even in the effective ranging range. The amount of defocus in each ranging image at the two ranging points is calculated from Equations (1) to (6). An evaluation value DFR decreases as the absolute value of the amount of defocus DEF increases with reference to a position 1501b at which the amount of defocus DEF is zero. The evaluation value DFR can be expressed as Equation (10).

$$DFR = c1 - c2 \times |DEF| \qquad (10)$$

In Equation (10), c1 is a value of DFR at a position 1501b. c1>0, which is a maximum value of DFR. Further, c2 is an arbitrary coefficient, and c2>0. However, it is assumed that the values of c1 and c2 are set so that DFR>0 regardless of the value of DEF.

As described above, it is possible to reduce the evaluation value DFR as the absolute value |DEF| of the amount of defocus increases. Accordingly, since a measurement error caused by the amount of defocus can be reduced, it is possible to calculate a more accurate ranging value.

Figure 15C:
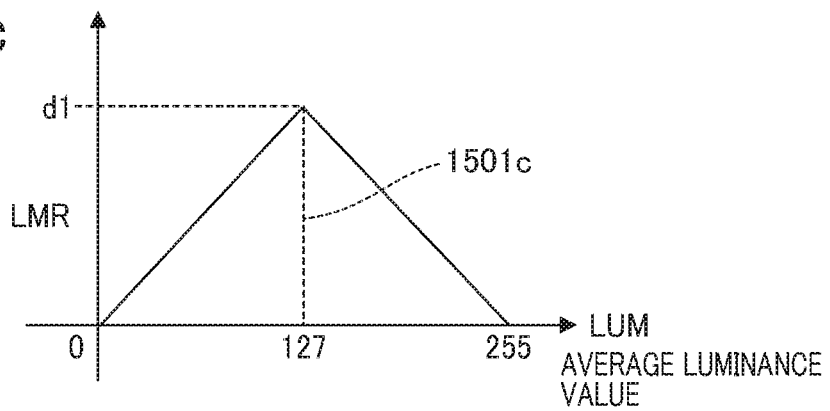

FIG. 15C is a diagram illustrating reliability of reproducibility based on an evaluation value of an average luminance value. For an average luminance value LUM shown on a horizontal axis, an evaluation value thereof is denoted with LMR and shown on a vertical axis. For the luminance values at the two ranging points in each ranging image, an average value of luminance values of pixels in the vicinity of the coordinates of each of the two ranging points in each ranging image is calculated. A range of the vicinity can be arbitrarily set. The average luminance value being relatively greater (or smaller) than an intermediate value in a range expressing the luminance indicates that the average luminance value is brighter (or darker) than the intermediate luminance value. If the average luminance value is too bright or too dark than the intermediate value of the luminance, there is a likelihood of occurrence of an error in a case in which the ranging point of each ranging image is searched for, and there is a likelihood of occurrence of a calculation error of the amount of defocus. As these errors increase, the ranging accuracy decreases. In the example illustrated in FIG. 15C, the average luminance value LUM shown on the horizontal axis is expressed in a range from 0 to 255. The evaluation value LMR decreases as the average luminance value LUM increases (or decreases) with reference to a position 1501c corresponding to an intermediate value 127. The evaluation value LMR can be expressed as Equation (11).

$$LMR = d1 - d2 \times |((LM/2) - LUM)| \quad (11)$$

d1 shown in Equation (11) is a value at the position 1501c corresponding to the intermediate value 127, and d1>0, which is a maximum value of the LMR. A value of a coefficient d2 can be arbitrarily set, and it is assumed that d2>0. LM is a maximum value of the expressible luminance value, and FIG. 15C shows an example of 255.

As described above, it is possible to reduce the evaluation value LMR as the average luminance value LUM deviates from the intermediate value of the expressible luminance value. Accordingly, it is possible to reduce a measurement error caused by the average luminance value, such that the ranging value can be calculated with higher accuracy.

Figure 15D:
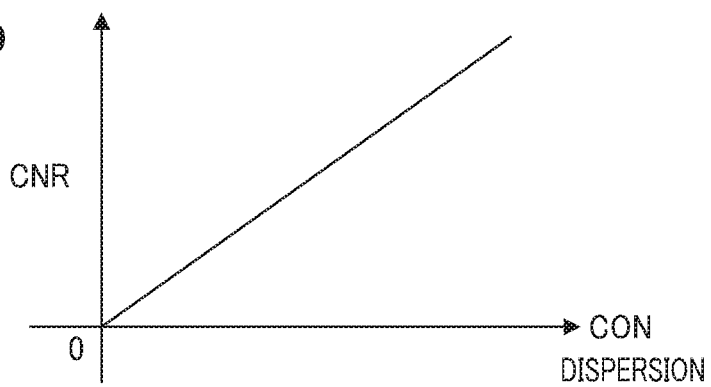

FIG. 15D is a diagram illustrating reliability of reproducibility based on an evaluation value of the dispersion value. For a dispersion value CON of an image shown on a horizontal axis, an evaluation value thereof is denoted with CNR and shown on a vertical axis. Dispersion values of two ranging points in the ranging image can be calculated from dispersion values of the pixels in the vicinity of the coordinates of each of the two ranging points in each ranging image. A range of the vicinity can be arbitrarily set at the time of the calculation. When the dispersion value is small, that is, when the contrast is low, an error occurs when the ranging point of each ranging image is searched for, and a calculation error of the amount of defocus occurs. Accordingly, the ranging accuracy is degraded. As illustrated in FIG. 15D, the evaluation value CNR increases as the dispersion value CON increases. CNR can be expressed by Equation (12).

$$CNR = e1 \times CON \quad (12)$$

In Equation (12), e1 is a proportional coefficient for controlling the value of CNR. Since the dispersion value CON is CON≥0, CNR is expressed with a value equal to or greater than zero.

As described above, it is possible to increase the evaluation value as the dispersion value increases. Accordingly, since it is possible to reduce the measurement error caused by the dispersion value, it is possible to calculate a more accurate ranging value.

When the reliability of the reproducibility is expressed as Rr, the reliability is calculated as a product of three evaluation values as shown in Equation (13) according to Equations (10), (11), and (12).

$$Rr = DFR \times LMR \times CNR \quad (13)$$

That is, the reliability Rr of the reproducibility in the reliability determination process can be determined by evaluating each of the amount of defocus DEF, the average luminance value LUM, and the dispersion value CON. In the embodiment, the method of calculating the evaluation value DFR of the amount of defocus, the evaluation value LMR of the average luminance value, and the evaluation value CNR of the dispersion value using Equation (10), (11), and (12) has been described. The present invention is not limited thereto, and a method of determining each evaluation value by providing a reference table based on parameters in advance may be adopted. Further, the reliability Rr of the reproducibility is not limited to the method of calculating reliability Rr of the reproducibility using Equation (13), but may be determined using the reference table based on the parameters. In this case, the Rr can be determined on the basis of a relationship among the respective evaluation values DFR, LMR, CNR.

In step S805, the evaluation value in each ranging image of the two ranging points is determined from the reliability Rs of the trueness and the reliability Rr of the reproducibility. This evaluation value (denoted with R) is calculated using Equation (14).

$$R = (s \times Rs) \times (r \times Rr) \quad (14)$$

In Equation (14), s and r are weighting parameters for the reliabilities Rs and Rr, respectively. An arbitrary value of s≥0 and r=0 is set.

As described above, when there is the condition-satisfying image and the reliability Rs of the trueness is not prioritized as the evaluation value, the evaluation value in each ranging image at the two ranging points can be determined from the reliabilities of the trueness and the reproducibility.

Next, a case in which the reliability Rs of the trueness is prioritized as the evaluation value will be described. In this case, the process proceeds from S802 to S806. In step S806, a determination process is performed on the second condition. The second condition is that there are a plurality of condition-satisfying images. When the second condition is not satisfied, that is, when it is determined that there is no plurality of condition-satisfying images, the process proceeds to S807. Further, if the second condition is satisfied, the process proceeds to S808. In step S807, the evaluation value is determined so that the evaluation value of the condition-satisfying image is maximized. That is, this is the same meanings as setting the evaluation value R of the ranging points (two points) in the ranging image in which two points as ranging points do not exist in an effective ranging range of one image in the plurality of ranging images, to zero. The evaluation value R at the ranging point in the ranging image which is not a condition-satisfying image is set as s=0 in Equation (14). As described above, when there is one condition-satisfying image and the reliability of the trueness is prioritized as the evaluation value, the evaluation value can be determined so that the evaluation value of the condition-satisfying image is maximized.

On the other hand, in S808, a process of excluding ranging images other than the condition-satisfying image from the acquired ranging images is performed. Accordingly, a calculation burden required for calculation of the reliability in each ranging image is performed.

In step S809, a process of determining the reliability of the reproducibility in each of the ranging images at the two ranging points is performed. The reliability of reproducibility can be calculated in the same way as the reliability Rr of the reproducibility obtained by Equations (10) through (13). However, if it is determined in S801 that there is no condition-satisfying image, the reliability Rr of reproducibility is calculated for all ranging images. On the other hand, if it is determined in S806 that there are a plurality of condition-satisfying images, the reliability Rr of reproducibility is calculated only for the condition-satisfying images.

After S809, the process proceeds to S810, and the evaluation value R in the ranging image of each ranging point is calculated from the reliability Rr of reproducibility. The evaluation value R is calculated using Equation (15).

$$R = r \times Rr \quad (15)$$

r is a coefficient parameter for the reliability Rr, and an arbitrary value of r≥0 is set.

Accordingly, it is possible to determine the evaluation value in the ranging image of each ranging point when there is no condition-satisfying image (if the process proceeds from S801 to S809). Even when there are a plurality of condition-satisfying images and the reliability of trueness is prioritized as the evaluation value, the evaluation value in the ranging image of each ranging point can be determined.

Figure 16:
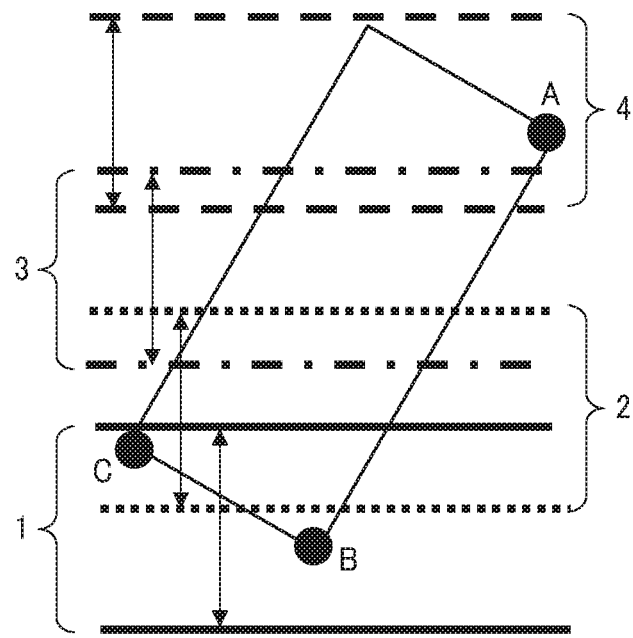
FIG. 16 is a schematic diagram illustrating an example of effective ranging ranges and a plurality of ranging points for each image.

An evaluation method based on the evaluation value determined in S303 of FIG. 4 will be described with reference to FIG. 16. FIG. 16 is an illustrative diagram illustrating specific ranging points A, B, and C in the effective ranging range described with reference to FIG. 3. A case in which each evaluation value is determined between the ranging points A and B, between the ranging points A and C, and between the ranging points B and C will be illustrated.

TABLE 1

|  | R with focus movement | R without focus movement |
| --- | --- | --- |
| Example 1 (point A) | | |
| n = 1 | 10 | |
| n = 2 | 20 | |
| n = 3 | 50 | |
| n = 4 | 80 | |
| Example 1 (point B) | | |
| n = 1 | 80 | |
| n = 2 | 50 | |
| n = 3 | 20 | |
| n = 4 | 10 | |

Table 1 shows a specific example in which the evaluation values of the ranging points A and B are determined with respect to the positional relationship between the ranging points A and B. A variable n (=1, 2, . . . ) which is a natural number indicates an identification number assigned to distinguish between the respective ranging images. The value of n corresponds to a number in parentheses in effective ranging ranges (1) to (4) illustrated in FIG. 16, "R without focus movement" is an evaluation value when the amount of movement of the focus is zero and "R with focused movement" is an evaluation value when the amount of movement of the focus is not zero. It is assumed that the ranging point A is in the effective ranging range (4), the ranging point B is in the effective ranging range (1), and the ranging point C is in the effective ranging ranges (1) and (2).

In the example of FIG. 16, there is no ranging image in which the ranging points A and B are in the effective ranging range of one image. Therefore, the evaluation value R without focus movement cannot be determined, and only the evaluation value R with focus movement is determined. For example, a maximum evaluation value R (=80) at the ranging point A is determined in a ranging image captured in the effective ranging range at n=4. A maximum evaluation value R (=80) at the ranging point B is determined in a ranging image captured in the effective ranging range at n=1. That is, with regard to the ranging image to be used for calculation of the length between the ranging points A and B, an evaluation value is calculated from the ranging image at n=4 for the ranging point A, and an evaluation value is calculated from the ranging image at n=1 for the ranging point B. Specific examples in which the evaluation values of the ranging points A and C are determined with respect to a positional relationship between the ranging points A and C is shown in Table 2.

TABLE 2

|  | R with focus movement | R without focus movement |
| --- | --- | --- |
| Example 2 (point A) | | |
| n = 1 | 10 | |
| n = 2 | 20 | |
| n = 3 | 50 | |
| n = 4 | 80 | |
| Example 2 (point C) | | |
| n = 1 | 70 | |
| n = 2 | 80 | |
| n = 3 | 50 | |
| n = 4 | 10 | |

In the example of FIG. 16, there are no ranging images in which the ranging points A and C are in an effective ranging range of one image. Therefore, the evaluation value R without focus movement is not determined, and only the evaluation value R with focus movement is determined. A maximum evaluation value R (=80) at the ranging point A is determined in the ranging image captured in the effective ranging range at n=4. The ranging point C is included in the effective ranging range (1) corresponding to n=1 and the effective ranging range (2) corresponding to n=2, but the ranging image at n=2 in which R=80 can be determined through comparison between the evaluation values. That is, with respect to the ranging image used for calculation of the length between the ranging points A and C, the evaluation value is calculated from the ranging image at n=4 for the ranging point A and the evaluation value is calculated from the ranging image at n=2 for the ranging point C. A specific example in which each of evaluation values of ranging points B and C is determined with respect to the positional relationship between ranging points B and C is shown in Table 3.

TABLE 3

|  | R with focus movement | R without focus movement |
|---|---|---|
| Example 3 (point B) | | |
| n = 1 | 80 | 90 |
| n = 2 | 50 | |
| n = 3 | 20 | |
| n = 4 | 10 | |
| Example 3 (point C) | | |
| n = 1 | 70 | 80 |
| n = 2 | 80 | |
| n = 3 | 50 | |
| n = 4 | 10 | |

In the example of FIG. 16, there is a ranging image in which the ranging points B and C are in the effective ranging range of one image. It is possible to determine both the evaluation value R without focus movement and the evaluation value R with focus movement. For the ranging point B, the evaluation value R at n=1 is a maximum for R with focus movement and R without focus movement. Therefore, it is possible to determine the ranging image at n=1 as the ranging image to be used for the ranging point B. Further, for the ranging point C, the evaluation value is maximized at n=1 in the case of R without focus movement, and the evaluation value is maximized at n=2 in the case of R with focus movement. In such a case, a process of comparing a product of the evaluation values in the case of R with focus movement and a product of the evaluation values in the case of R without focus movement is performed. Specifically, when the evaluation value product in the case of R with focus movement is expressed as PA, PA is calculated as shown in Equation (16).

$$PA = 80 \times 80 = 6400 \quad (16)$$

On the other hand, when the evaluation value product in the case of no focus movement R is expressed as PB, the evaluation value product is calculated as shown in Equation (17).

$$PB = 90 \times 80 = 7200 \quad (17)$$

Therefore, since PB>PA, use of the ranging image with n=1 as the ranging image to be used for the ranging point B and the ranging point C can be determined on the basis of the evaluation value of R without focus movement.

Next, a process of calculating the three-dimensional coordinates of each ranging point and a length between two points from the ranging image determined on the basis of the evaluation value will be described. The coordinates of the ranging point in the three-dimensional space are calculated on the basis of the imaging information acquired by the imaging information acquisition unit 104, the ranging point selected by the ranging point selection unit 105, and the amount of defocus DEF obtained from the ranging image. The coordinates can be expressed as (x, y, z) and can be calculated using Equations (18) to (22). Here, as a three-dimensional coordinate system, a center of an exit pupil is defined as an optical axis center, and an axis in which the amount of defocus DEF is zero is defined as a z axis.

$$(h, v) = (hb, hv) \times PY \quad (18)$$

$$(H, V) = (h, v) \times (1 - DEF/L) \quad (19)$$

$$(x, y) = (H, V) \times |dist/(dist - d + DEF)| \quad (20)$$

$$dist = 1/(1/(dist - d + DEF) - 1/f) \quad (21)$$

$$z = length - dist \quad (22)$$

A meaning of each symbol is as follows.

(H, v): coordinates of the ranging point on an imaging sensor surface (Hb, hv): coordinates of the ranging point on the image PY: pixel pitch L: pupil distance (H, V): coordinates on an xy plane defocused from the coordinates (h, v) on the imaging sensor surface dist: distance from an object principal point in the lens of the imaging device to the subject dist_d: a distance from an image principal point in the lens of the imaging device to the imaging sensor surface f: a focal length of the imaging optical system length: distance from the imaging sensor surface of the imaging device to the subject (a subject distance)

The distance calculation unit 109 calculates three-dimensional coordinates (x, y, z) of the ranging points (two points) using Equations (18) to (22). However, when the ranging images for calculating the coordinates of the ranging points are different from each other at the two points, it is necessary to moving the three-dimensional coordinates (x, y, z) in parallel to the z axis in one ranging image. When a z-coordinate after the parallel movement is denoted with zn and a z coordinate before the parallel movement is denoted with zb, Zn is calculated from Equation (23).

$$zn = zb - (length\ A - length\ B) \quad (23)$$

In Equation (23), length A is a subject distance in the ranging image in which the parallel movement is not performed and length B is a subject distance in the ranging image in which the parallel movement is performed. For the subject distance, distance information to the focus position can be measured by, for example, a laser ranging unit. For example, there is a method of acquiring the subject distance for each image for all of a plurality of captured images. Further, there is a method of acquiring distance information (a subject distance) in an arbitrary number of images, or a method of calculating the subject distance according to a focal length at the time of imaging and a lateral magnification ratio. It is possible to save time and effort as compared with a case in which the subject distance is measured for all of the plurality of images. Specifically, the lateral magnification ratio is defined as D1:D2 and the distance from the position of the focal length f to the subject is denoted with D. The distance D can be calculated using Equation (24).

$$D = (D1/D2) \times f \quad (24)$$

The focal length f can be obtained by the imaging device reading lens state information at the time of imaging. Since the subject distance "length A" is a sum of the distance D and the focal length f, length A can be calculated using Equation (25).

$$length\ A = D + f \quad (25)$$

The three-dimensional coordinates of the ranging point A are denoted with (xa, ya, za), the three-dimensional coordinates of the ranging point B are denoted with (xb, yb, zb), and a length of a line segment from the ranging point A to the ranging point B is denoted with LEN. LEN is calculated using Equation (26).

$$LEN = (\sqrt{((xa-xb)^2 + (ya-yb)^2 + (za-zb)^2)} \quad (26)$$

"^" denotes exponentiation.

Accordingly, it is possible to calculate the three-dimensional coordinates of each ranging point and the length between the two points from the ranging image determined on the basis of the evaluation value, and the display unit 110 displays the length between the two points that is a measurement result.

Figure 17A:
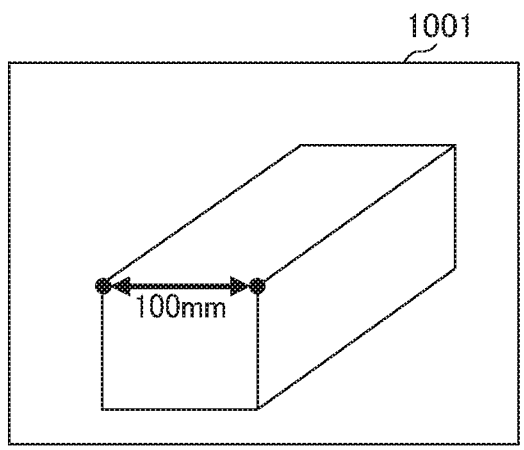
FIGS. 17A and 17B are diagrams illustrating a process of display ranging values.
Figure 17B:
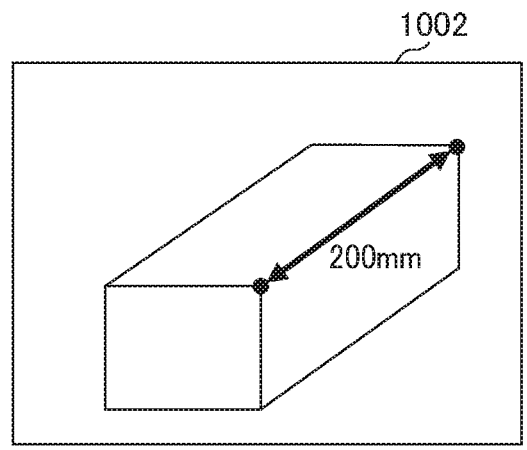

FIGS. 17A and 17B are schematic diagrams illustrating examples of a screen if measurement results are presented to the user. A measurement distance between two points located on the frontmost side in a depth direction of a subject is displayed on a display screen 1001 illustrated in FIG. 17A, and a measurement distance between two points in a side surface portion 2 in the depth direction of the subject is displayed on a display screen 1002 illustrated in FIG. 17B. In these examples, positions of the two designated points and a length between the two points are displayed on a screen. A user can easily ascertain a calculated length between the ranging points. In the embodiment, an image to be used for calculation of the length between the two points in a three-dimensional space can be automatically selected on the basis of the evaluation value at each ranging point in each ranging image, and a more accurate ranging value can be calculated and present.

Second Embodiment

Next, a second embodiment of the present invention will be described. In measurement of the length in the depth direction using the pupil division imaging method, the ranging accuracy is influenced by the amount of defocus, luminance, contrast, a signal to noise ratio (SNR) of the captured image, and a distance from the imaging device to the subject. Further, since the depth of field becomes deep by setting the F-number to a small aperture to shorten a base line length, the amount of defocus at the distance from the focus position can be reduced. Therefore, a range in which ranging is possible can be widened, but ranging resolution is lowered and the ranging accuracy is degraded. For this reason, it is necessary to perform focus bracket imaging for capturing a plurality of images while changing the focus position with the same angle of view with respect to the same subject in order to more accurately measure the length in the three-dimensional space between the two points designated with respect to the subject.

When focus bracket imaging (hereinafter also simply referred to as bracket imaging) is performed, the number of brackets (the number of times of imaging) can be set as much as possible within a range of the focus position, but such a method is not realistic due to temporal restrictions. Therefore, it is necessary to determine an additional imaging method on the basis of a distance range in the depth direction (hereinafter referred to as an effective ranging range) that can be acquired through one imaging at a certain focus position. In the embodiment, a process of determining an imaging method for bracket imaging on the basis of the effective ranging range will be described. It should be noted that differences from the first embodiment will mainly be described, the same matters as those in the first embodiment will be denoted with the same reference numerals already used, and detailed description thereof will be omitted.

Figure 18:
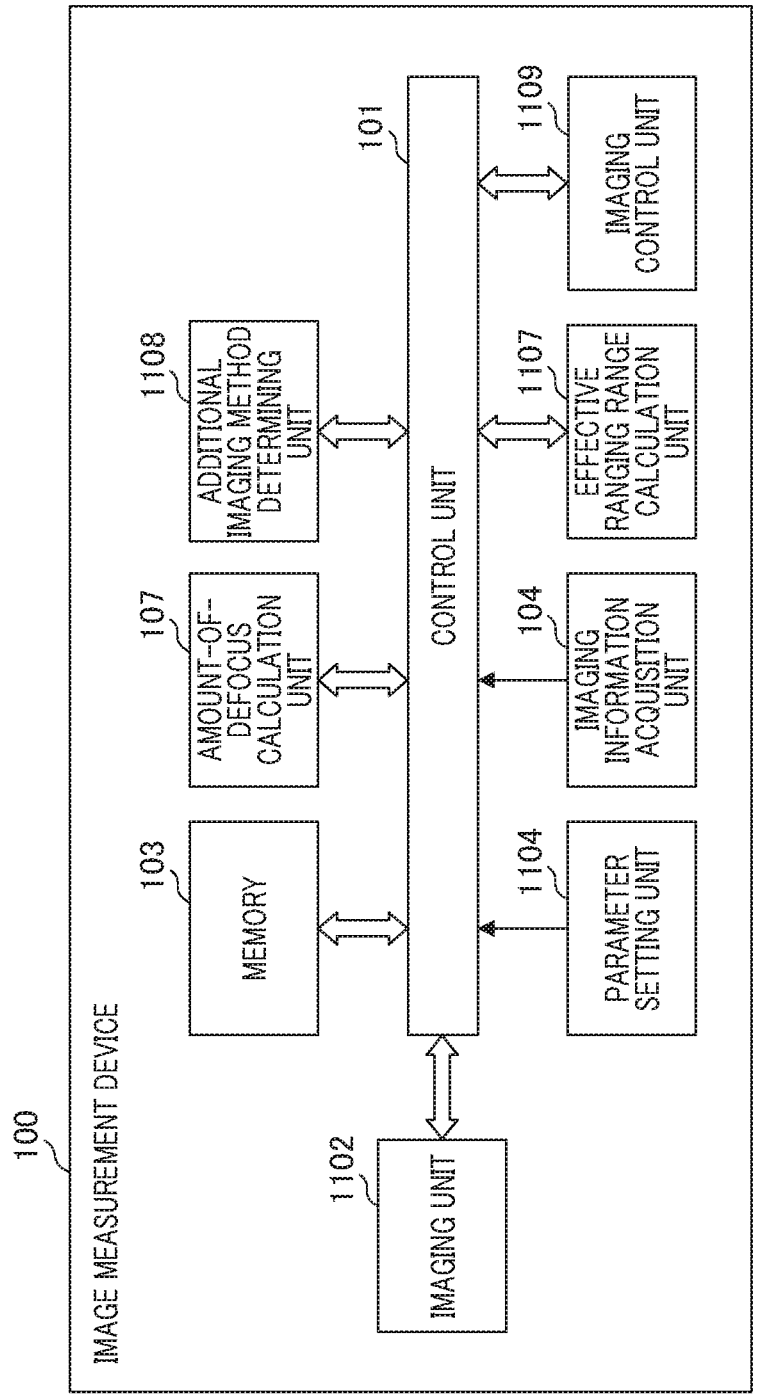
FIG. 18 is a block diagram illustrating a configuration of a device according to a second embodiment.

FIG. 18 is a block diagram illustrating an example of a configuration of the image measurement device 100 according to the embodiment. Differences from FIG. 1 are as follows.

The imaging unit 1102 is provided in place of the image input unit 102.

A parameter setting unit 1104, an effective ranging range calculation unit 1107, an additional imaging method determination unit 1108, and an imaging control unit 1109 are provided.

Since other components (see reference numerals 108 to 110 in FIG. 1) are the same as those in the first embodiment, illustration thereof will be omitted.

The imaging unit 1102 includes a pupil division type imaging element, images a subject, and outputs captured image data to the memory 103 according to a control instruction from the control unit 101. The parameter setting unit 1104 performs a process of setting each piece of parameter information input to the image measurement device 100 by the user and outputs setting data to the memory 103 according to a control instruction from the control unit 101.

The imaging information at the time of imaging associated with the captured image is acquired by the imaging information acquisition unit 104 and output to the memory 103 according to a control instruction from the control unit 101. The defocus amount calculation unit 107 reads the image information and the imaging information stored in the memory 103 and calculates the amount of defocus corresponding to each coordinate of the image. The calculated amount of defocus is stored in the memory 103 according to a control instruction from the control unit 101.

The effective ranging range calculation unit 1107 reads the image information, the parameter information, the imaging information, and data of the amount of defocus stored in the memory 103, and calculates the effective ranging range of the image. The effective ranging range calculation unit 1107 performs an effective ranging range determination process and stores data of the effective ranging range in the memory 103. The additional imaging method determination unit 1108 reads the data of the amount of defocus and the effective ranging range stored in the memory 103 and determines the additional imaging method. Data of the determined additional imaging method is stored in the memory 103 according to a control instruction from the control unit 101. The imaging control unit 1109 reads the data of the additional imaging method stored in the memory 103 and controls the imaging unit 1102 via the control unit 101.

The operation of the image measurement device 100 will be described in detail with reference to the flowchart of FIG. 19. First, in step S1901, the parameter setting unit 1104 performs a process of setting parameters of the image measurement device 100. The parameters to be set include at least the following information.

(A) Imaging conditions (an F-number, ISO sensitivity, shutter speed, or the like) at the time of provisional ranging.

(B) Necessary ranging accuracy (C) Upper limit of the number of bracket imaging.

The imaging conditions at the time of the provisional ranging can be determined on the basis of the set parameters, and an additional imaging method can be determined on the basis of a result of the determination, the necessary ranging accuracy, and the upper limit value of the number of bracket imaging.

In step S1902, a provisional ranging process is executed. A provisional ranging method will be described below with reference to FIG. 20. In step S1903, a bracket imaging method is determined on the basis of a provisional ranging result calculated in step S1902. The bracket imaging method will be described below with reference to FIG. 21. In step S1904, bracket imaging is performed using the method determined in step S1903. The series of processes end. Hereinafter, each process will be described in detail.

Figure 19:
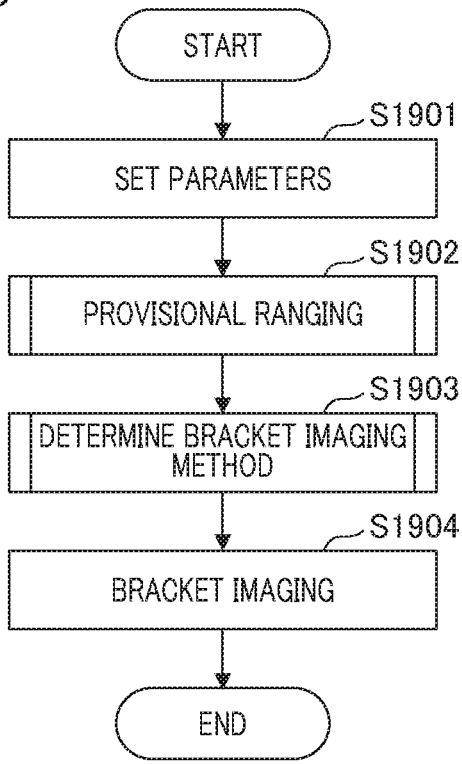
FIG. 19 is a flowchart illustrating an operation in the second embodiment.
Figure 20:
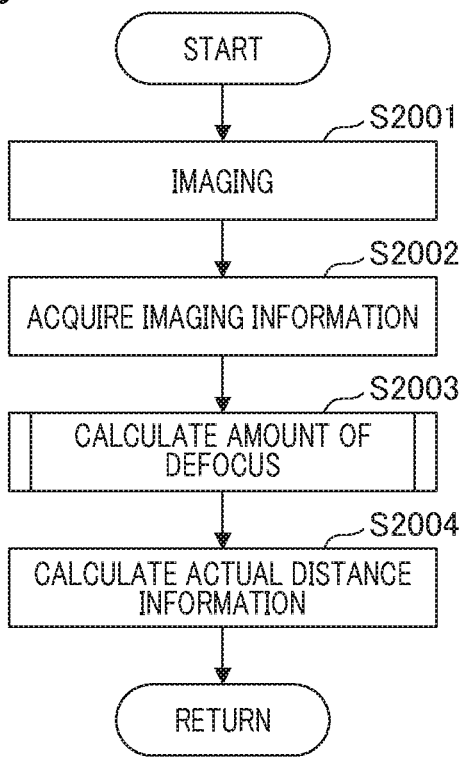
FIG. 20 is a flowchart illustrating provisional ranging according to the second embodiment.

FIG. 20 is a flowchart illustrating the provisional ranging method in step S1902 of FIG. 19. In step S2001, the imaging unit 1102 images the subject on the basis of the parameters set in step S1901 of FIG. 19. In step S2002, the imaging information acquisition unit 104 acquires imaging information at the time of imaging performed in step S2001. The imaging information is, for example, the information (a) to (h) shown in the first embodiment. A focal length and a lateral magnification ratio of the imaging optical system are acquired as focus position information of the imaging device.

In step S2003, the defocus amount calculation unit 107 calculates the amount of defocus related to the image captured in step S2001 on the basis of the imaging information acquired in step S2002. Details of the process of calculating the amount of defocus are as described in the first embodiment. The amount of defocus of the image captured for provisional ranging is calculated by performing repeated calculation while shifting a position of the pixel of interest pixel by pixel.

In step S2004, the control unit 101 calculates actual distance information from the amount of defocus calculated in step S2003. When the actual distance at each point in the image is denoted with z, the actual distance can be calculated from Equations (27) and (28).

$$\text{dist}=1/(1/(\text{dist}-d+DEF)-1/f) \quad (27)$$

$$z=\text{length}-\text{dist} \quad (28)$$

Meanings of respective symbols are as follows.
Dist: distance from the object principal point of the lens of the imaging unit 1102 to the subject
Dist_d: distance from the image principal point of the lens of the imaging unit 1102 to the imaging sensor surface
f: focal length of the imaging optical system
length: distance from the imaging sensor surface of the image measurement device 100 to the subject.

For the distance "length", there are a method of measuring a distance to the focus position using a laser ranging unit, and a method of calculating the distance using a focal length f and a lateral magnification ratio at the time of imaging. The distance D from a position of the focal length f to the subject can be obtained using Equation (24) above from the lateral magnification ratio D1:D2 and the focal length f. The focal length f can be acquired from focus position information at the time of imaging. Since the distance "length" is a sum of the distance D and the focal length f, the length can be obtained using Equation (29).

$$\text{length}=D+f \quad (29)$$

After S2004, the process shifts to a returning process.

Figure 21:
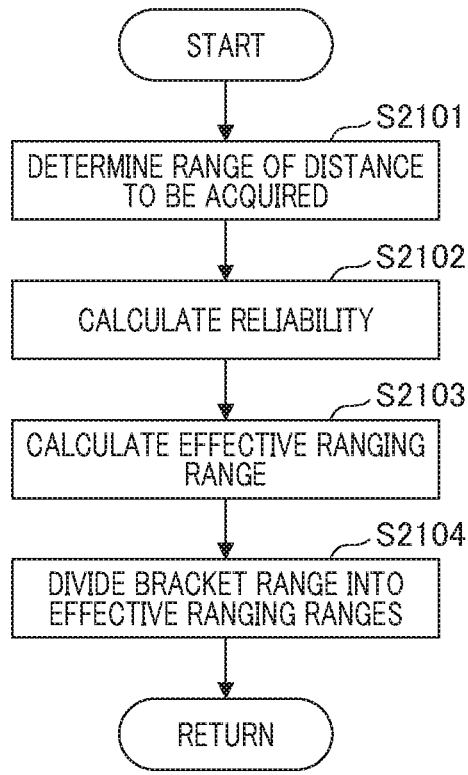
FIG. 21 is a flowchart illustrating an imaging method according to the second embodiment.

Next, focus bracket imaging according to the embodiment will be described. FIG. 21 is a flowchart illustrating a bracket imaging method. In step S2101, the effective ranging range calculation unit 1107 determines a range of distance to be acquired. A method of determining the bracket range will be described with reference to FIG. 22.

Figure 22:
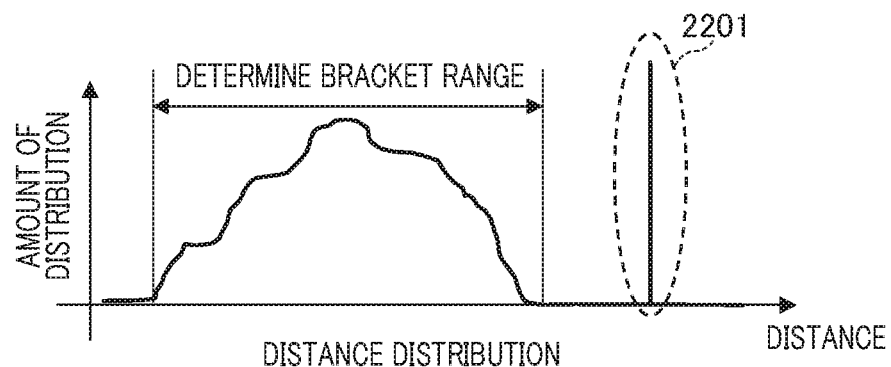
FIG. 22 is a diagram illustrating an imaging range according to the second embodiment.

FIG. 22 is a histogram of the results of the provisional ranging acquired in S1902 of FIG. 19 as a distribution of distances in the image. A horizontal axis indicates the distance, and a vertical axis indicates the amount of distribution of the distance. A distance distribution 2201 indicates the amount of distance distribution of an image portion determined to be a background. A range of a distance distribution located on the front side (the imaging unit 1102 side) relative to the distance distribution 2201 is determined as a bracket range (a focus bracket imaging range). Further, in addition to this method, the bracket range can be determined by further combining subject recognition results in a device including a subject recognition unit that recognizes a facial area or the like. For example, a distance range of a recognized subject is determined to be the bracket range on the basis of a histogram of the subject distance recognized by the subject recognition unit. Alternatively, a range having the amount of distance distribution equal to or greater than a predetermined threshold value can be determined as the bracket range. The bracket range is not limited to one, and may be a plurality of ranges.

In S2102 of FIG. 21, reliability related to the image data acquired at the time of the provisional ranging is calculated. The reliability can be calculated by evaluating the luminance value of the image, the contrast, the estimated amount of noise, and the distance to the focus position. For the luminance value of the image, an average luminance value is calculated by calculating an average value from luminance values of nearby pixels at respective coordinates of the image captured at the time of provisional ranging. The reliability of the reproducibility based on the evaluation value LMR of the average luminance value has been described with reference to FIG. 15C. Further, for a dispersion value related to the contrast, dispersion values of the nearby pixels at the respective coordinates of the image captured at the time of provisional ranging are calculated. The reliability of the reproducibility based on the evaluation value CNR of the dispersion value has already been described with reference to FIG. 15D).

Figure 23A:
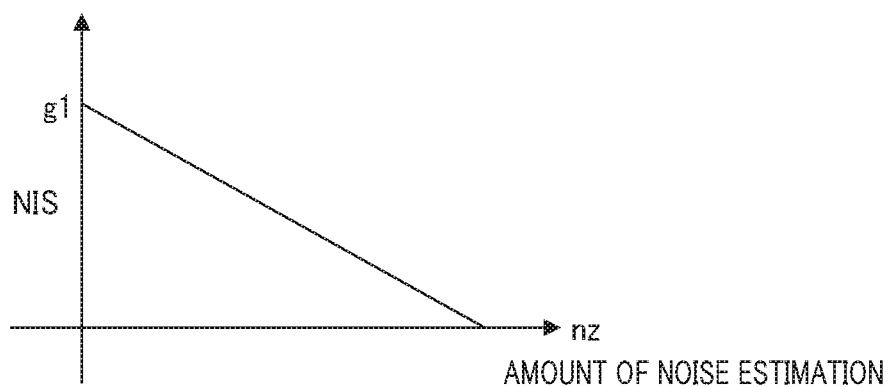
FIGS. 23A and 23B are diagrams illustrating evaluation values of reliability according to the second embodiment.

FIG. 23A is a diagram illustrating an evaluation value regarding the amount of estimated noise of an image. A horizontal axis indicates the amount of estimated noise, and a vertical axis indicates the evaluation value (denoted with NIS) of the amount of estimated noise. The amount of estimated noise is calculated on the basis of an ISO value at the time of imaging. The amount of estimated noise increases as the ISO value increases. If the amount of estimated noise is large, the contrast becomes high, and therefore, the evaluation value of the dispersion value is influenced. Further, if the influence of noise has influence on the symmetry of the image A and the image B at the time of calculation of the amount of defocus, there is a likelihood of degradation of the ranging accuracy.

As illustrated in FIG. 23A, an evaluation value NIS is determined to decrease as the amount of estimated noise increases. When the amount of estimated noise is denoted with nz, the evaluation value NIS is calculated using the following equation.

$$NIS=g1-g2\times nz \quad (30)$$

Constants g1 and g2 are both positive values and can be arbitrarily set. If the estimated amount of noise nz is not evaluated, $$NIS=g3 \quad (31)$$

g3>0, and a value of g3 can be arbitrarily set.

Thus, the evaluation value NIS of the amount of estimated noise decreases as the estimated amount of noise nz increases. Accordingly, since the measurement error caused by noise can be reduced, it is possible to calculate a more accurate ranging value.

Figure 23B:
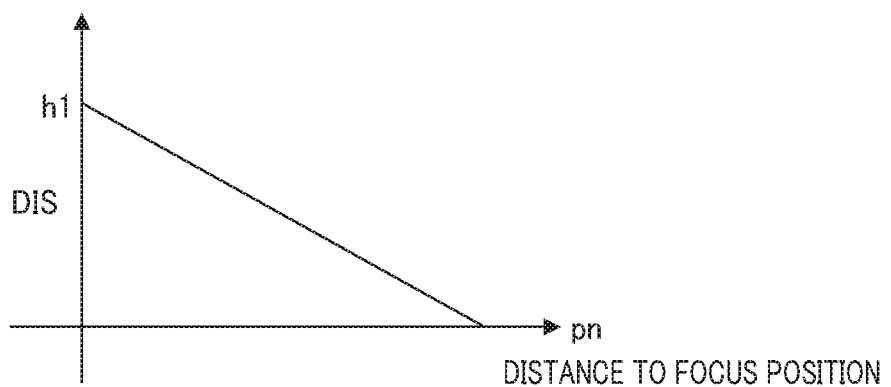

FIG. 23B is a diagram illustrating an evaluation value regarding the distance to the focus position. A horizontal axis indicates a distance pn to the focus position, and a vertical axis indicates an evaluation value DIS.

For the distance pn, the ranging accuracy decreases as the distance increases. The ranging accuracy decreases in inverse proportion to a square of the distance pn. As illustrated in FIG. 23B, the evaluation value DIS is determined to decrease as the distance pn increases. The evaluation value DIS is calculated from the following equation using the distance pn.

$$DIS = h1 - h2 \times pn \quad (32)$$

Both the constants h1 and h2 are positive values and can be arbitrarily set. When the distance pn is not evaluated, $$DIS = h3 \quad (33).$$

h3>0, and a value of h3 can be arbitrarily set.

As described above, the evaluation value DIS decreases as the distance pn increases. Accordingly, since a measurement error caused by the distance to the focus position can be reduced, it is possible to calculate a more accurate ranging value.

In the reliability determination process, the reliability Rp is calculated from a product of the respective evaluation values, as in the first embodiment.

$$Rp = LMR \times CNR \times NIS \times DIS \quad (34)$$

The reliability Rp is normalized and expressed in a range of 0 to 1 by setting the parameters so that a value range of each of the evaluation values LMR, CNR, NIS, and DIS is from 0 to 1. For each evaluation value and reliability, there is a calculation method using a parameter table in addition to a calculation method using equations.

The reliability calculated for each pixel is finally converted into reliability specific to a distance. The reliability specific to a distance is calculated by addition-averaging reliabilities of a group of pixels having the same distance information calculated for each pixel or having similar values of the distance information. Accordingly, it is possible to calculate reliability of pixels having specific distance information.

In step S2103 of FIG. 21, the effective ranging range calculation unit 1107 calculates the effective ranging range. A specific example will be described with reference to FIGS. 24A and 24B. In the embodiment, a distance range in the depth direction that can be acquired through one imaging at a specific focus position is calculated as the effective ranging range.

Figure 24A:
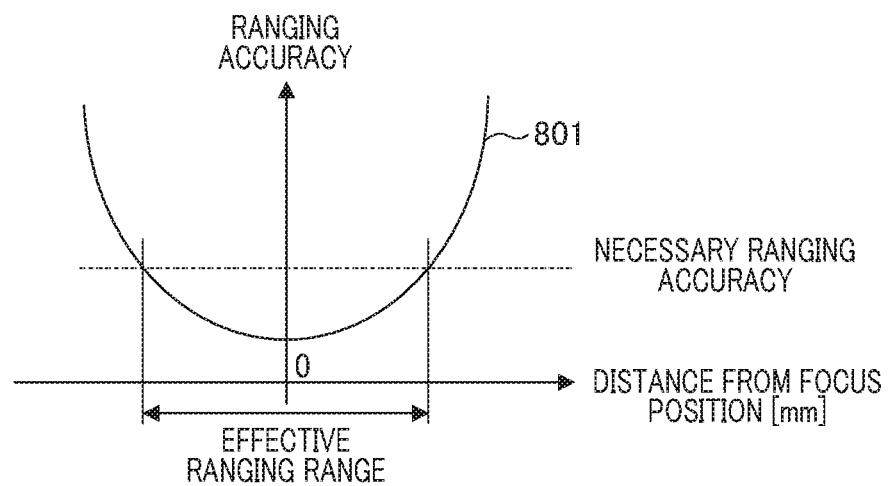
FIGS. 24A and 24B are diagrams illustrating effective ranging ranges according to the second embodiment.

FIG. 24A is a schematic diagram illustrating a relationship between a distance from the focus position on a horizontal axis and ranging accuracy on a vertical axis. The effective ranging range calculation unit 1107 performs an effective ranging range determination process on the basis of necessary ranging accuracy. A function curve 801 is determined as shown in Equation (35).

$$y = A \times x^2 + C \quad (35)$$

y denotes a ranging accuracy value, and A denotes a coefficient that is determined from a conversion coefficient according to a magnitude of an opening angle of a centroid of a light beam passing through a pair of ranging pupil areas. x denotes a distance from the focus position, and C indicates an intercept that is calculated from the reliability calculated in S2102. A value of the coefficient A is set to increase as the F-number of the imaging optical system decreases. The intercept C is calculated as shown in Equation (36) from a relationship among an intercept (C1) if the reliability is the highest, a intercept (C2) if the reliability is the lowest, and the reliability (denoted with R).

$$C = C2 - (C2 - C1) \times R \quad (36)$$

For the function curve 801 defined in this way, the effective ranging range can be calculated on the basis of necessary ranging accuracy designated by the user. That is, the effective ranging range is a distance range if the ranging accuracy (a y-value) is equal to or smaller than a designated ranging accuracy value.

Figure 24B:
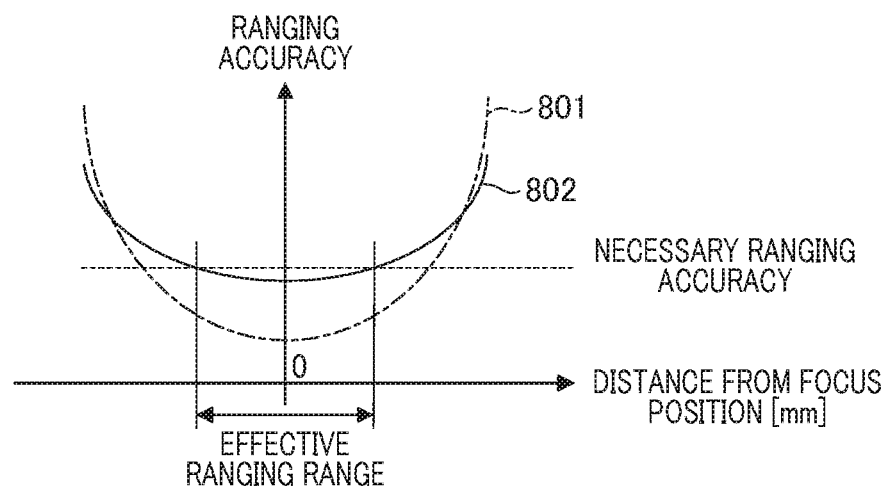

FIG. 24B illustrates another function curve 802, with respect to the function curve 801 illustrated in FIG. 24A. The function curve 802 is an example of a function curve if the F-number is great and the reliability is low. The necessary ranging accuracy in FIG. 24A is assumed to be the same as ranging accuracy in FIG. 24B. In this case, it can be seen that the effective ranging range in the function curve 802 is narrower than the effective ranging range illustrated in FIG. 24A. Thus, it is possible to calculate an effective ranging range that satisfies the necessary ranging accuracy on the basis of the F-number and the reliability.

Figure 25A:
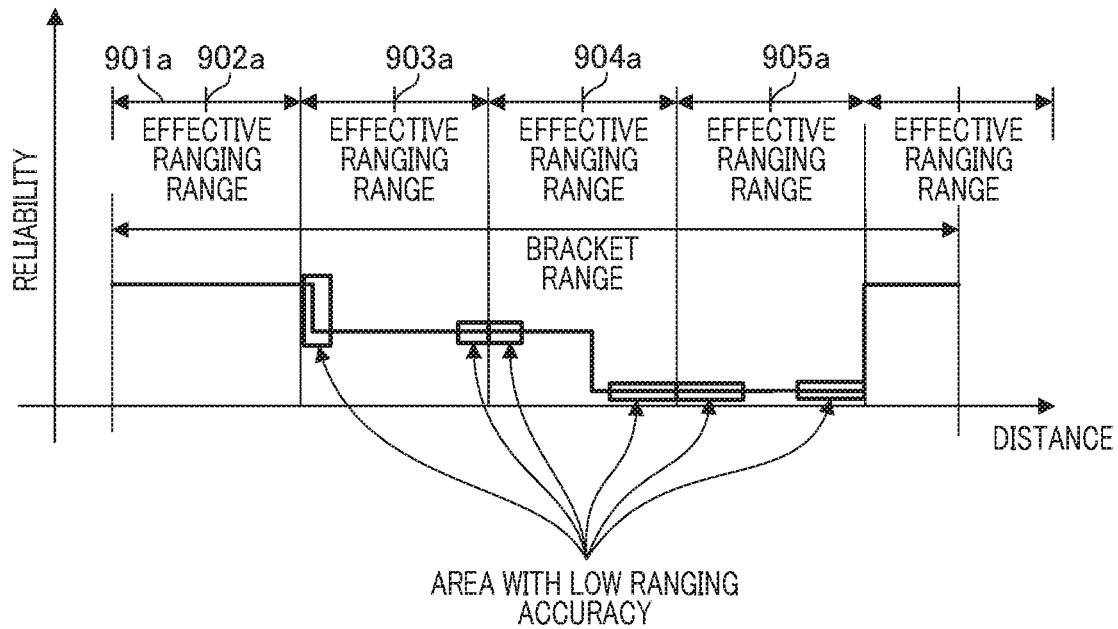
FIGS. 25A and 25B are diagrams illustrating an imaging method according to the second embodiment.

In S2104 of FIG. 21, a process of dividing the bracket range into the effective ranging ranges calculated in S2103 is executed. This will be described in detail with reference to FIGS. 25A and 25B. In FIG. 25A, a horizontal axis indicates the distance and the vertical axis indicates the reliability R. This is an example in which the bracket range is equally divided into the effective ranging ranges when the reliability R is a maximum value.

An effective ranging range 901a illustrated in FIG. 25A indicates an effective ranging range when imaging has been performed at a focus position 902a. If the equal division is performed, areas with low ranging accuracy may be generated by evaluating the reliability R. The areas with low ranging accuracy are indicated by solid rectangular frames. A case in which the areas with low ranging accuracy are generated will be described with reference to FIG. 25B.

Figure 25B:
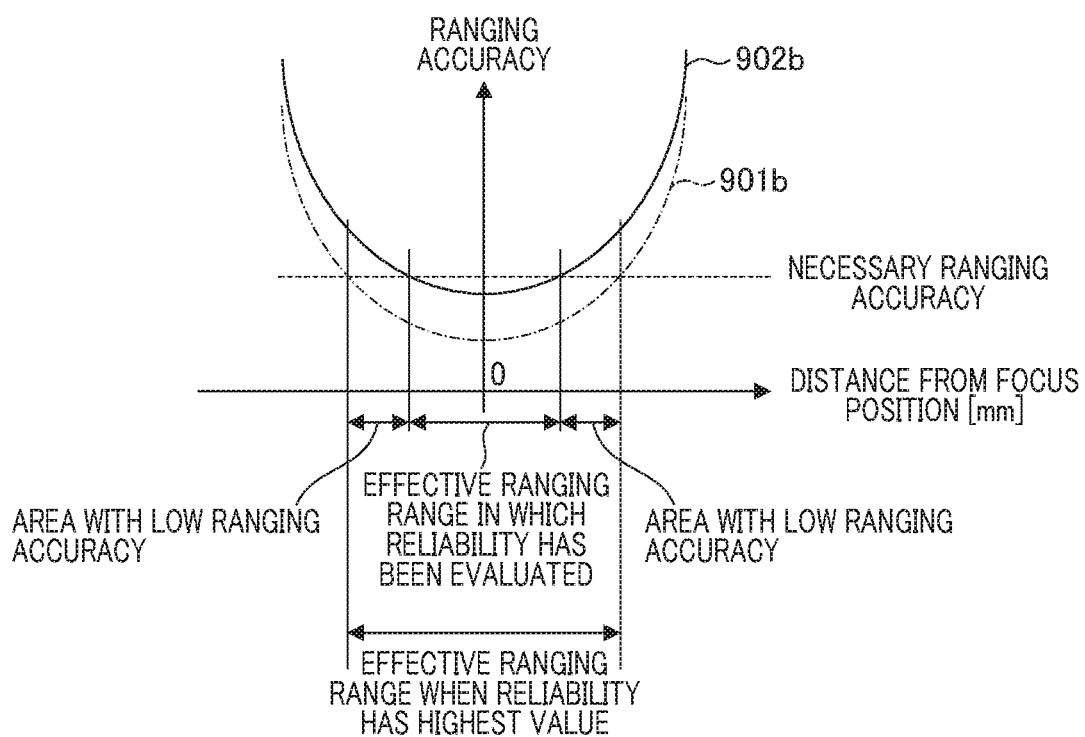

FIG. 25B illustrates a relationship between a distance from the focus position shown on a horizontal axis and ranging accuracy shown on a vertical axis. A function curve 901b is a function curve when the reliability R is a highest value. A function curve 902b is a function curve when the reliability is taken into consideration and located above the function curve 901b. When a first effective ranging range calculated from the function curve 901b is compared with a second effective ranging range calculated from the function curve 902b, it is seen that the first effective ranging range includes the second effective ranging range and a range with low ranging accuracy. That is, the second effective ranging range is narrower. By evaluating the reliability, the effective ranging range is narrowed even when the focus position is the same.

In the example illustrated in FIG. 25A, when sufficient ranging accuracy cannot be obtained by uniform division, the division process is further executed. For example, effective ranging ranges when the reliability R is a maximum value, in which the ranging accuracy is not sufficiently obtained, are indicated by ranges 903a, 904a, and 905a. These ranges are further divided.

Figure 26A:
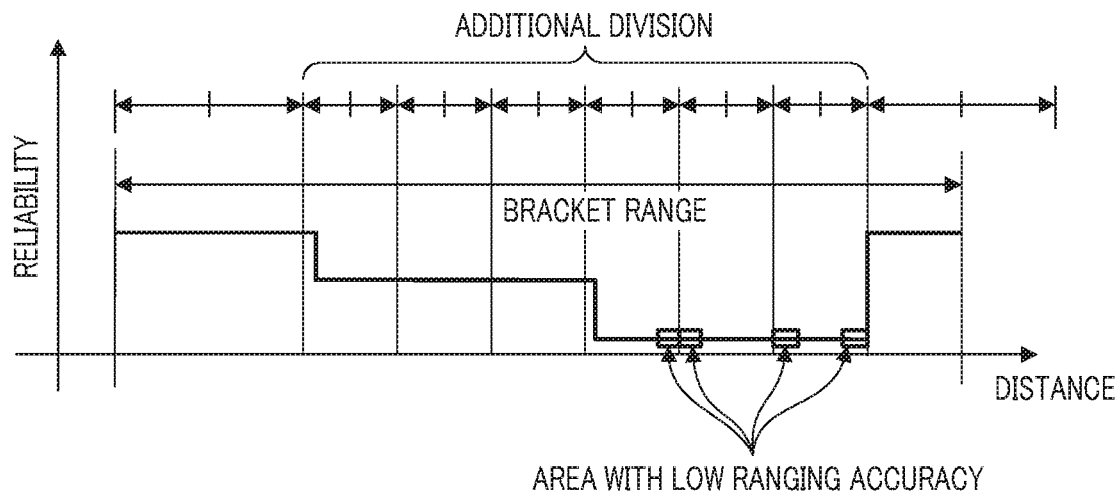
FIGS. 26A to 26C are diagrams illustrating an imaging, method when the number of divisions of the effective ranging range is increased.

FIG. 26A illustrates a result of equally dividing the effective ranging range including areas with low ranging accuracy in FIG. 25A into two areas. In this example, if the reliability R is further evaluated for the divided areas, there is an area with low ranging accuracy. Therefore, the area is further equally divided into two areas, and the dividing process is repeated until there is no area with low ranging accuracy. Finally, a result of dividing the bracket range as illustrated in FIG. 26B is obtained, and there is no area with low ranging accuracy.

Figure 26B:
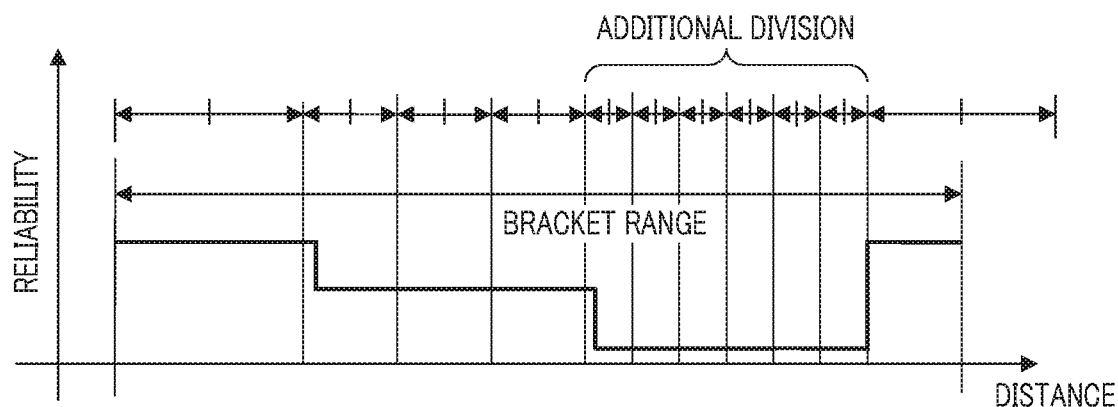
Figure 26C:
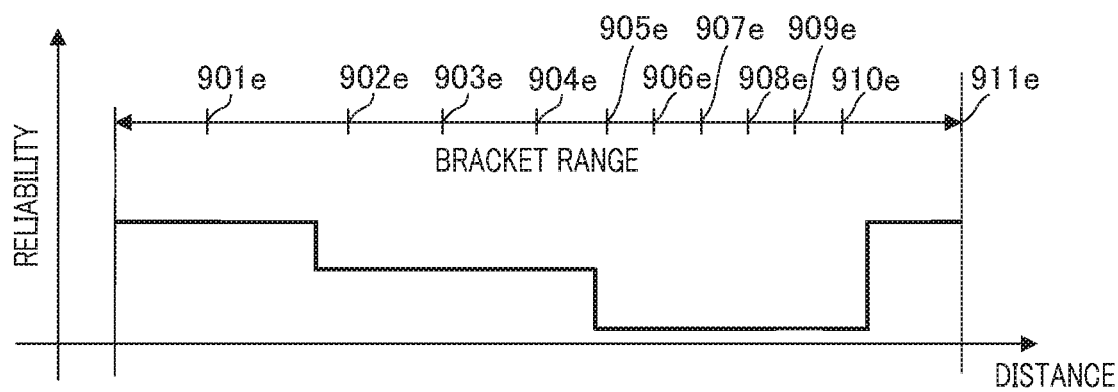

FIG. 26C illustrates focus positions 901e to 911e when the bracket range is divided into effective ranging ranges as illustrated in FIG. 26B, and reliability for each distance. By performing imaging at each focus position after the division, it is possible to obtain necessary ranging accuracy. The above process is performed by the additional imaging method determination unit 1108. Although it is possible to improve the ranging accuracy by dividing the bracket range into the effective ranging ranges, there is a method of limiting the number of divisions, in addition to a method of repeating the division until there is no area with low ranging accuracy. In this case, the number of divisions is limited on the basis of the number of brackets set by the parameter setting unit 1104. All of the bracket ranges cannot be acquired with necessary ranging accuracy, an efficient bracket imaging method can be set within the limited number of brackets.

Furthermore, when the bracket range becomes very widened, the number of brackets may be desired to be prioritized. The depth of field is increased by setting Equations (35) and (36) so that the bracket range can be acquired as widely as possible with the limited number of brackets, and bracket imaging is performed. On the other hand, if the ranging accuracy is desired to be prioritized when the bracket range is very narrow, the depth of field is decreased and the bracket imaging is performed.

In the embodiment, an additional division process is performed on an event in which necessary ranging accuracy is not satisfied in uniform division of the bracket range and an area with low ranging accuracy occurs. In this case, when the focus position is unnecessarily minutely set and an interval is excessively reduced without evaluating the reliability, the effective ranging ranges overlap, which causes inefficiency. Further, the number of images in bracket imaging increases. Therefore, the imaging control unit 1109 performs control so that bracket imaging is performed at the focus position illustrated in FIG. 26C on the basis of the result of reliability evaluation. Efficient bracket imaging satisfy necessary ranging accuracy is possible. According to the embodiment, it is possible to efficiently acquire the distance information satisfying any condition of ranging accuracy by determining an imaging method for bracket imaging on the basis of the effective ranging range in which the reliability has been evaluated.

In the above embodiment, distance information corresponding to each ranging point is calculated from the amount of image shift or the amount of defocus of image data pairs with different viewpoints as the distance information corresponding to the plurality of image data, and a length between the designated ranging points is calculated using the distance information. The present invention is not limited thereto and can be applied to an embodiment in which it is determined in advance whether or not distance information obtained by using a certain pair of parallax image data is used on the basis of the amount of image shift of a pair of image data at each focus position for each area of the image, that is, a pair of parallax image data. In this case, since calculation of distance information for each area of the image is required only once, the above is suitable for simplification and high speed of the process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-188390, filed Sep. 28, 2017, No. 2017-253584, filed Dec. 28, 2017 which are hereby incorporated by reference wherein in their entirety.

What is claimed is:

1. An image measurement device comprising:
at least one processor and at least one memory functioning as:
   a first acquisition unit that acquires a plurality of image data captured at a plurality of focus positions and at different viewpoints;
   a second acquisition unit that acquires distance information corresponding to each of the plurality of image data on the basis of the image data at different viewpoints at each focus position;
   a designation unit that designates a ranging point;
   a determination unit that determines reliability corresponding to the ranging point in each of the plurality of image data;
   a selection unit that selects the distance information used as the distance information of the ranging point from the distance information acquired by the second acquisition unit on the basis of the reliability determined by the determination unit, and
   a calculation unit that calculates a length between two ranging points in a three-dimensional space including a depth direction of the image from the distance information selected by the selection unit at two ranging points specified by the designation unit.

2. The image measurement device according to claim 1, wherein the designation unit designates the two ranging points on the basis of an instruction from an operating unit operated by a user or by detecting a feature point of the image.

3. The image measurement device according to claim 1, wherein the determination unit determines the reliability on the basis of the distance information of the two ranging points in each of the plurality of images and an effective ranging range in each image.

4. The image measurement device according to claim 3, wherein the determination unit sets the reliability to be higher than that when the distance information of the two ranging points are not in the effective ranging range when the distance information of the two ranging points in each of the plurality of images are both in the effective ranging range in the image.

5. The image measurement device according to claim 1, wherein the determination unit determines the reliability at the ranging point according to the amount of image shift or the amount of defocus calculated at the two ranging points in each of the plurality of image data.

6. The image measurement device according to claim 5, wherein the determination unit sets the reliability to be lower than that when the amount of image shift or the amount of defocus is a second value smaller than the first value when the amount of image shift or the amount of defocus calculated at the two ranging points in each of the plurality of image data is a first value.

7. The image measurement device according to claim 1, wherein the determination unit determines the reliability at the ranging point according to a luminance value calculated at the two ranging points in the plurality of image data.

8. The image measurement device according to claim 7, wherein the determination unit sets the reliability to be lower than that when the luminance value is a second value that is a value that is separated from the first value by a predetermined value when the luminance value calculated at the two ranging points in the plurality of image data is a first value.

9. The image measurement device according to claim 1, wherein the determination unit determines the reliability at the ranging point according to a dispersion value of the pixel calculated at the two ranging points in the plurality of image data.

10. The image measurement device according to claim 1, wherein the determination unit sets the reliability to be lower than that when the luminance value is a second value that is greater than the first value when a dispersion value of the pixel calculated at the two ranging points in the plurality of image data is a first value.

11. The image measurement device according to claim 1, wherein the second acquisition unit acquires distance information of the subject through laser ranging.

12. The image measurement device according to claim 1, wherein the second acquisition unit acquires the distance information of the subject calculated using a ratio of a focal length and a lateral magnification of an imaging optical system.

13. The image measurement device according to claim 1, comprising a display unit configured to display a length between the ranging points calculated by the calculation unit.

14. The image measurement device according to claim 1, wherein the selection unit selects the distance information corresponding to higher reliability among the plurality of image data.

15. An image measurement device comprising:
at least one processor and at least one memory functioning as:
  a first acquisition unit that acquires a plurality of image data captured at a plurality of focus positions and at different viewpoints;
  a second acquisition unit that acquires distance information corresponding to each of the plurality of image data on the basis of the image data at different viewpoints at each focus position;
  a determination unit that determines reliability corresponding to a ranging point in each of the plurality of image data;
  a selection unit that selects the distance information used as the distance information of each ranging point from the distance information acquired by the second acquisition unit on the basis of the reliability determined by the determination unit, and
wherein the determination unit determines the reliability at the ranging point according to the amount of image shift or the amount of defocus calculated at the ranging point in each of the plurality of image data.

16. The image measurement device according to claim 15, wherein the selection unit selects the distance information corresponding to higher reliability among the plurality of image data.

17. An image measurement device comprising:
at least one processor and at least one memory functioning as:
  a first acquisition unit that acquires a plurality of image data captured at a plurality of focus positions and at different viewpoints;
  a second acquisition unit that acquires distance information corresponding to each of the plurality of image data on the basis of the image data at different viewpoints at each focus position;
  a determination unit that determines reliability corresponding to a ranging point in each of the plurality of image data;
  a selection unit that selects the distance information used as the distance information of each ranging point from the distance information acquired by the second acquisition unit on the basis of the reliability determined by the determination unit, and
wherein the second acquisition unit acquires the distance information of the subject calculated using a ratio of a focal length and a lateral magnification of an imaging optical system.

18. An image measurement device comprising:
at least one processor and at least one memory functioning as:
  a first acquisition unit that acquires a plurality of image data captured at a plurality of focus positions and at different viewpoints;
  a second acquisition unit that acquires distance information corresponding to each of the plurality of image data on the basis of the image data at different viewpoints at each focus position; and
  a selection unit that selects the distance information used as the distance information of each ranging point from the distance information acquired by the second acquisition unit on the basis of an amount of image shift or an amount of defocus calculated at the ranging point in each of the plurality of image data, wherein the selection unit selects the distance information corresponding to higher reliability among the plurality of image data.

* * * * *